US012508063B2

(12) United States Patent
Roman et al.

(10) Patent No.: US 12,508,063 B2
(45) Date of Patent: Dec. 30, 2025

(54) ELECTROSURGICAL APPARATUS WITH FLEXIBLE SHAFT

(71) Applicant: Apyx Medical Corporation, Clearwater, FL (US)

(72) Inventors: Shawn D. Roman, Safety Harbor, FL (US); Fredrik Jonsson, St. Petersburg, FL (US); Bradley A Rentschler, New Port Richey, FL (US); Himanshu K Bhatt, Tampa, FL (US); Tyler W Stewart, St. Petersburg, FL (US)

(73) Assignee: Apyx Medical Corporation, Clearwater, FL (US)

( * ) Notice: Subject to any disclaimer, the term of this patent is extended or adjusted under 35 U.S.C. 154(b) by 620 days.

(21) Appl. No.: 17/801,275

(22) PCT Filed: Feb. 20, 2021

(86) PCT No.: PCT/US2021/018941
§ 371 (c)(1),
(2) Date: Aug. 22, 2022

(87) PCT Pub. No.: WO2021/173453
PCT Pub. Date: Sep. 2, 2021

(65) Prior Publication Data
US 2023/0093858 A1    Mar. 30, 2023

Related U.S. Application Data

(60) Provisional application No. 62/981,558, filed on Feb. 26, 2020.

(51) Int. Cl.
*A61B 18/04* (2006.01)
*A61B 18/00* (2006.01)
*A61B 18/14* (2006.01)

(52) U.S. Cl.
CPC .. *A61B 18/042* (2013.01); *A61B 2018/00101* (2013.01); *A61B 2018/00166* (2013.01);
(Continued)

(58) Field of Classification Search
CPC ........ A61B 18/042; A61B 2017/00473; A61B 2018/00101; A61B 2018/00166;
(Continued)

(56) References Cited

U.S. PATENT DOCUMENTS 1,813,902 A    7/1931    Bovie
2,435,442 A    2/1948    Gurewitsch
(Continued)

FOREIGN PATENT DOCUMENTS

CN    110719759 A    1/2020
DE    2429021 A1    1/1976
(Continued)

OTHER PUBLICATIONS

International Search Report and Written Opinion for PCT Application No. PCT/US2021/018941; dated May 17, 2021; nine (9) pages.

*Primary Examiner* — Tigist S Demie
(74) *Attorney, Agent, or Firm* — Michael J Porco; Gerald E Hespos

(57) ABSTRACT

An electrosurgical apparatus is provided including a connector, a flexible shaft, and a distal tip. The connector may further be coupled to an electrosurgical generator and gas supply. The distal tip of the electrosurgical apparatus may be grasped by a grasping tool, such that the orientation and position of the distal tip relative to the shaft may be manipulated to achieve a plurality of positions. The electrosurgical apparatus provides electrosurgical energy and inert gas to an electrode within the distal tip of the electrosurgical apparatus to generate a plasma beam. In one aspect, the distal tip is configured as a sheath that is extendable and
(Continued)

retractable over the electrode to expose the electrode when the sheath is in a first position and conceal or cover the electrode when the sheath is in a second position.

20 Claims, 19 Drawing Sheets

(52) U.S. Cl.
CPC .............. *A61B 2018/00178* (2013.01); *A61B 2018/00571* (2013.01); *A61B 2018/00988* (2013.01); *A61B 2018/1475* (2013.01)

(58) Field of Classification Search
CPC A61B 2018/00172; A61B 2018/00178; A61B 2018/00196; A61B 2018/00571; A61B 2018/00577; A61B 2018/00583; A61B 2018/00988; A61B 2018/1475
See application file for complete search history.

(56) References Cited

U.S. PATENT DOCUMENTS

| | | | |
|---|---|---|---|
| 3,239,730 A | 3/1966 | George | |
| 3,801,766 A | 4/1974 | Morrison | |
| 4,127,110 A | 11/1978 | Bullara | |
| 4,196,734 A | 4/1980 | Harris | |
| 4,545,375 A | 10/1985 | Cline | |
| 4,580,562 A | 4/1986 | Goof et al. | |
| 4,619,258 A | 10/1986 | Pool | |
| 4,625,723 A | 12/1986 | Altnether et al. | |
| 4,632,109 A | 12/1986 | Paterson | |
| 4,708,137 A | 11/1987 | Tsukagoshi | |
| 4,827,927 A | 5/1989 | Newton | |
| 4,884,557 A | 12/1989 | Takehana et al. | |
| 4,905,691 A | 3/1990 | Rydell | |
| 4,930,494 A | 6/1990 | Takehana et al. | |
| 5,061,268 A | 10/1991 | Fleenor | |
| 5,088,997 A | 2/1992 | Delahuerga et al. | |
| 5,098,430 A | 3/1992 | Fleenor | |
| 5,133,714 A | 7/1992 | Beane | |
| 5,197,963 A | 3/1993 | Parins | |
| 5,201,899 A | 4/1993 | Austin, Jr. et al. | |
| 5,207,675 A | 5/1993 | Canady | |
| 5,244,462 A | 9/1993 | Delahuerga et al. | |
| 5,254,117 A | 10/1993 | Rigby et al. | |
| 5,256,138 A | 10/1993 | Burek et al. | |
| 5,257,451 A | 11/1993 | Edwards et al. | |
| 5,269,780 A | 12/1993 | Roos | |
| 5,306,238 A | 4/1994 | Fleenor | |
| 5,347,992 A | 9/1994 | Pearlman et al. | |
| 5,400,267 A | 3/1995 | Denen et al. | |
| 5,403,342 A | 4/1995 | Tovey et al. | |
| 5,413,575 A | 5/1995 | Haenggi | |
| 5,425,375 A | 6/1995 | Chin et al. | |
| 5,445,635 A | 8/1995 | Denen et al. | |
| 5,449,356 A | 9/1995 | Walbrink et al. | |
| 5,496,314 A | 3/1996 | Eggers | |
| 5,514,157 A | 5/1996 | Nicholas et al. | |
| 5,626,575 A | 5/1997 | Crenner | |
| 5,647,869 A | 7/1997 | Goble et al. | |
| 5,651,780 A | 7/1997 | Jackson et al. | |
| 5,660,657 A | 8/1997 | Rajala et al. | |
| 5,693,042 A | 12/1997 | Boiarski et al. | |
| 5,693,044 A | 12/1997 | Cosmescu | |
| 5,697,909 A | 12/1997 | Eggers et al. | |
| 5,720,745 A | 2/1998 | Farin et al. | |
| 5,743,880 A | 4/1998 | Hlavka | |
| 5,776,092 A | 7/1998 | Farin et al. | |
| 5,800,427 A | 9/1998 | Zamba | |
| 5,836,909 A | 11/1998 | Cosmescu | |
| 5,836,944 A | 11/1998 | Cosmescu | |
| 5,908,381 A | 6/1999 | Aznoian et al. | |
| 5,916,213 A | 6/1999 | Haissaguerre et al. | |
| 5,921,915 A | 7/1999 | Aznoian et al. | |
| 5,922,003 A | 7/1999 | Anctil et al. | |
| 6,017,340 A | 1/2000 | Cassidy et al. | |
| 6,063,081 A | 5/2000 | Mulier et al. | |
| 6,099,523 A | 8/2000 | Kim et al. | |
| 6,146,380 A | 11/2000 | Racz et al. | |
| 6,149,648 A | 11/2000 | Cosmescu | |
| 6,193,715 B1 | 2/2001 | Wrublewski et al. | |
| 6,225,593 B1 | 5/2001 | Howieson et al. | |
| 6,231,571 B1 | 5/2001 | Ellman et al. | |
| 6,293,945 B1 | 9/2001 | Parins et al. | |
| 6,293,960 B1 | 9/2001 | Ken | |
| 6,325,799 B1 | 12/2001 | Goble | |
| 6,391,027 B1 | 5/2002 | Farin et al. | |
| 6,409,724 B1 | 6/2002 | Penny et al. | |
| 6,451,016 B1 | 9/2002 | Karakozian | |
| 6,458,125 B1 | 10/2002 | Cosmescu | |
| 6,475,215 B1 | 11/2002 | Tanrisever | |
| 6,508,815 B1 | 1/2003 | Strul et al. | |
| 6,558,383 B2 | 5/2003 | Cunningham et al. | |
| 6,578,579 B2 | 6/2003 | Burnside et al. | |
| 6,602,249 B1 | 8/2003 | Stoddard et al. | |
| 6,648,839 B2 | 11/2003 | Manna et al. | |
| 6,652,514 B2 | 11/2003 | Ellman et al. | |
| 6,740,079 B1 | 5/2004 | Eggers et al. | |
| 6,743,239 B1 | 6/2004 | Kuehn et al. | |
| 6,770,071 B2 | 8/2004 | Woloszko et al. | |
| 6,852,112 B2 | 2/2005 | Platt | |
| 6,899,538 B2 | 5/2005 | Matoba | |
| 6,958,063 B1 | 10/2005 | Soll et al. | |
| 6,994,707 B2 | 2/2006 | Ellman et al. | |
| 7,033,353 B2 | 4/2006 | Stoddard et al. | |
| 7,056,303 B2 | 6/2006 | Dennis et al. | |
| 7,070,596 B1 | 7/2006 | Woloszko et al. | |
| 7,115,121 B2 | 10/2006 | Novak | |
| 7,156,842 B2 | 1/2007 | Sartor et al. | |
| 7,156,844 B2 | 1/2007 | Reschke et al. | |
| 7,163,525 B2 | 1/2007 | Franer | |
| 7,169,144 B2 | 1/2007 | Hoey et al. | |
| 7,198,625 B1 | 4/2007 | Hui et al. | |
| 7,235,071 B2 | 6/2007 | Gonnering | |
| 7,244,257 B2 | 7/2007 | Podhajsky et al. | |
| 7,306,614 B2 | 12/2007 | Weller et al. | |
| 7,311,707 B2 | 12/2007 | Hagg et al. | |
| 7,316,682 B2 | 1/2008 | Konesky | |
| 7,335,199 B2 | 2/2008 | Goble et al. | |
| 7,354,435 B2 | 4/2008 | Farin et al. | |
| 7,422,585 B1 | 9/2008 | Eggers et al. | |
| 7,443,296 B2 | 10/2008 | Mezhinsky et al. | |
| 7,473,243 B2 | 1/2009 | Dennis et al. | |
| 7,479,140 B2 | 1/2009 | Ellman et al. | |
| 7,481,809 B2 | 1/2009 | Stern et al. | |
| 7,500,974 B2 | 3/2009 | Sartor | |
| 7,503,917 B2 | 3/2009 | Sartor et al. | |
| 7,568,619 B2 | 8/2009 | Todd et al. | |
| 7,578,817 B2 | 8/2009 | Canady | |
| 7,654,975 B2 | 2/2010 | Mantell | |
| 7,749,221 B2 | 7/2010 | Rontal | |
| 7,815,638 B2 | 10/2010 | Farin et al. | |
| 7,967,744 B2 | 6/2011 | Kaye et al. | |
| 7,993,339 B2 | 8/2011 | Kuhner | |
| 8,016,824 B2 | 9/2011 | Buchman et al. | |
| 8,022,327 B2 | 9/2011 | Blomeyer | |
| 8,096,943 B2 | 1/2012 | Melville | |
| 8,114,181 B2 | 2/2012 | Gogolin | |
| 8,133,223 B2 | 3/2012 | Docimo | |
| 8,177,782 B2 | 5/2012 | Beller et al. | |
| 8,216,220 B2 | 7/2012 | Jensen et al. | |
| 8,319,134 B2 | 11/2012 | Blomeyer | |
| 8,328,804 B2 | 12/2012 | Heard et al. | |
| 8,337,521 B2 | 12/2012 | Cooper et al. | |
| 8,353,905 B2 | 1/2013 | Jensen et al. | |
| 8,562,598 B2 | 10/2013 | Falkenstein et al. | |
| 8,568,400 B2 | 10/2013 | Gilbert | |
| 8,579,802 B2 | 11/2013 | Robertson | |
| 8,608,816 B2 | 12/2013 | Palmerton et al. | |
| 8,689,606 B2 | 4/2014 | Schellekens et al. | |
| 8,702,596 B2 | 4/2014 | Kaye et al. | |
| 8,998,899 B2 | 4/2015 | Shilev et al. | |
| 9,005,112 B2 | 4/2015 | Hasser et al. | |

(56) References Cited

U.S. PATENT DOCUMENTS

| | | |
|---|---|---|
| 9,050,113 B2 | 6/2015 | Bloom et al. |
| 9,060,750 B2 | 6/2015 | Lam |
| 9,060,765 B2 | 6/2015 | Rencher et al. |
| 9,084,847 B2 | 7/2015 | Klein et al. |
| 9,095,333 B2 | 8/2015 | Konesky et al. |
| 9,138,289 B2 | 9/2015 | Conley et al. |
| 9,144,374 B2 | 9/2015 | Maurice, Jr. |
| 9,144,448 B2 | 9/2015 | Amann et al. |
| 9,144,453 B2 | 9/2015 | Rencher et al. |
| 9,326,810 B2 | 5/2016 | Shilev et al. |
| 9,345,541 B2 | 5/2016 | Greeley et al. |
| 9,492,219 B2 | 11/2016 | Konesky et al. |
| 9,554,843 B2 | 1/2017 | Taylor et al. |
| 9,622,647 B2 | 4/2017 | Cushner et al. |
| 9,763,724 B2 | 9/2017 | Konesky et al. |
| 9,770,281 B2 | 9/2017 | Rencher et al. |
| 9,770,285 B2 | 9/2017 | Zoran et al. |
| 10,045,823 B2 | 8/2018 | Burbank |
| 10,064,675 B2 | 9/2018 | Rencher et al. |
| 10,441,369 B2 | 10/2019 | Shelton, IV et al. |
| 10,512,500 B2 | 12/2019 | Cosmescu |
| 11,272,973 B2 | 3/2022 | Gogolin |
| 2001/0025177 A1 | 9/2001 | Woloszko et al. |
| 2002/0013582 A1 | 1/2002 | Mulier et al. |
| 2003/0018318 A1 | 1/2003 | Melsky |
| 2003/0018323 A1 | 1/2003 | Wallace et al. |
| 2003/0050633 A1 | 3/2003 | Ellman et al. |
| 2003/0130655 A1 | 7/2003 | Woloszko et al. |
| 2004/0148903 A1 | 8/2004 | Cash |
| 2004/0162553 A1 | 8/2004 | Peng et al. |
| 2004/0181150 A1 | 9/2004 | Evans et al. |
| 2004/0243120 A1 | 12/2004 | Orszulak et al. |
| 2005/0075630 A1 | 4/2005 | Truckai et al. |
| 2005/0113820 A1 | 5/2005 | Goble et al. |
| 2005/0148903 A1 | 7/2005 | Diamantopoulos |
| 2005/0171528 A1 | 8/2005 | Sartor et al. |
| 2005/0192643 A1 | 9/2005 | Gonnering |
| 2005/0240172 A1 | 10/2005 | Hagg et al. |
| 2005/0267459 A1 | 12/2005 | Belhe et al. |
| 2006/0036237 A1 | 2/2006 | Davison et al. |
| 2006/0095074 A1 | 5/2006 | Lee et al. |
| 2006/0122595 A1 | 6/2006 | Farin et al. |
| 2006/0161190 A1 | 7/2006 | Gadberry et al. |
| 2007/0010809 A1 | 1/2007 | Hovda et al. |
| 2007/0028669 A1 | 2/2007 | Brewster |
| 2007/0034211 A1 | 2/2007 | Hug et al. |
| 2007/0049922 A1 | 3/2007 | Rontal |
| 2007/0049926 A1 | 3/2007 | Sartor |
| 2007/0083247 A1 | 4/2007 | Wyeth et al. |
| 2007/0093810 A1 | 4/2007 | Sartor et al. |
| 2007/0112343 A1 | 5/2007 | Mische et al. |
| 2007/0135812 A1 | 6/2007 | Sartor |
| 2007/0158209 A1 | 7/2007 | Kang et al. |
| 2007/0260239 A1 | 11/2007 | Podhajsky et al. |
| 2007/0270797 A1 | 11/2007 | Lu et al. |
| 2007/0282303 A1 | 12/2007 | Nash et al. |
| 2007/0282358 A1 | 12/2007 | Remiszewski et al. |
| 2008/0071261 A1 | 3/2008 | Orszulak |
| 2008/0108985 A1 | 5/2008 | Konesky |
| 2008/0132893 A1 | 6/2008 | D'Amelio et al. |
| 2008/0140066 A1 | 6/2008 | Davison et al. |
| 2008/0300593 A1 | 12/2008 | Mulier et al. |
| 2009/0005772 A1 | 1/2009 | Penny |
| 2009/0062791 A1 | 3/2009 | Lee et al. |
| 2009/0125020 A1 | 5/2009 | Douglass et al. |
| 2009/0125023 A1 | 5/2009 | Stephen et al. |
| 2009/0143778 A1 | 6/2009 | Sartor et al. |
| 2009/0149851 A1 | 6/2009 | Craig |
| 2009/0171271 A1 | 7/2009 | Webster et al. |
| 2009/0247822 A1 | 10/2009 | Okada et al. |
| 2009/0248022 A1 | 10/2009 | Falkenstein et al. |
| 2009/0253959 A1 | 10/2009 | Yoshie et al. |
| 2009/0270796 A1 | 10/2009 | Perry et al. |
| 2009/0306658 A1 | 12/2009 | Nobis et al. |
| 2010/0016856 A1 | 1/2010 | Platt, Jr. |
| 2010/0022824 A1 | 1/2010 | Cybulski et al. |
| 2010/0023008 A1 | 1/2010 | Heard et al. |
| 2010/0094288 A1 | 4/2010 | Kerr |
| 2010/0168827 A1 | 7/2010 | Schultz |
| 2010/0262139 A1 | 10/2010 | Beller et al. |
| 2011/0009856 A1 | 1/2011 | Jorgensen et al. |
| 2011/0118601 A1 | 5/2011 | Barnes et al. |
| 2011/0137115 A1 | 6/2011 | Suzuki |
| 2011/0238053 A1 | 9/2011 | Brannan et al. |
| 2011/0276113 A1 | 11/2011 | Cybulski |
| 2012/0046682 A1 | 2/2012 | Nelson et al. |
| 2012/0088974 A1 | 4/2012 | Maurice |
| 2012/0116397 A1 | 5/2012 | Rencher et al. |
| 2012/0123405 A1 | 5/2012 | Moua et al. |
| 2012/0197246 A1 | 8/2012 | Mauch |
| 2012/0232540 A1 | 9/2012 | Baur et al. |
| 2012/0303016 A1 | 11/2012 | Fischer et al. |
| 2012/0330305 A1 | 12/2012 | Zoran et al. |
| 2012/0330307 A1 | 12/2012 | Ladtkow et al. |
| 2013/0046290 A1 | 2/2013 | Palmer et al. |
| 2013/0138075 A1 | 5/2013 | Lambert |
| 2013/0218005 A1 | 8/2013 | Desai et al. |
| 2013/0237982 A1 | 9/2013 | Rencher et al. |
| 2013/0253498 A1 | 9/2013 | Germain et al. |
| 2013/0296846 A1 | 11/2013 | Canady et al. |
| 2014/0005665 A1 | 1/2014 | Konesky et al. |
| 2014/0018795 A1 | 1/2014 | Shilev et al. |
| 2014/0187866 A1 | 7/2014 | Kaye et al. |
| 2014/0236144 A1 | 8/2014 | Krueger et al. |
| 2014/0257276 A1 | 9/2014 | Sartor |
| 2014/0276393 A1 | 9/2014 | Park et al. |
| 2015/0038790 A1 | 2/2015 | Rontal et al. |
| 2015/0073342 A1 | 3/2015 | Pacheco et al. |
| 2015/0088060 A1 | 3/2015 | Wang et al. |
| 2015/0209047 A1 | 7/2015 | Whitman |
| 2015/0216582 A1 | 8/2015 | Nagtegaal et al. |
| 2015/0238254 A1 | 8/2015 | Seddon et al. |
| 2015/0238256 A1 | 8/2015 | Greeley et al. |
| 2015/0335388 A1 | 11/2015 | Iida et al. |
| 2015/0366602 A1 | 12/2015 | Rencher et al. |
| 2016/0022347 A1 | 1/2016 | Rencher et al. |
| 2016/0128766 A1 | 5/2016 | Hyodo et al. |
| 2016/0228171 A1 | 8/2016 | Boudreaux |
| 2016/0331438 A1 | 11/2016 | Staneker et al. |
| 2017/0215703 A1 | 8/2017 | Cushner et al. |
| 2017/0273733 A1 | 9/2017 | Weber |
| 2017/0312003 A1 | 11/2017 | Canady et al. |
| 2018/0014869 A1 | 1/2018 | Gogolin |
| 2018/0146925 A1 | 5/2018 | Mogul |
| 2019/0388135 A1* | 12/2019 | Gogolin ............ A61B 18/1477 |
| 2020/0085491 A1 | 3/2020 | Goliszek et al. |

FOREIGN PATENT DOCUMENTS

| | | |
|---|---|---|
| DE | 9117111 U1 | 11/1995 |
| DE | 102010061059 A1 | 4/2012 |
| EP | 0186369 A1 | 7/1986 |
| EP | 0878263 A1 | 11/1998 |
| EP | 1764057 A1 | 3/2007 |
| EP | 1764057 B1 | 4/2009 |
| EP | 2263728 A2 | 12/2010 |
| EP | 2449992 A1 | 5/2012 |
| EP | 3629968 A1 | 4/2020 |
| JP | 2007068596 A | 3/2007 |
| WO | 03001986 A2 | 1/2003 |
| WO | 2003082134 A1 | 10/2003 |
| WO | 2004096315 A2 | 11/2004 |
| WO | 2004096315 A3 | 7/2006 |
| WO | 2014031800 A1 | 2/2014 |
| WO | 2018222562 A1 | 12/2018 |

* cited by examiner

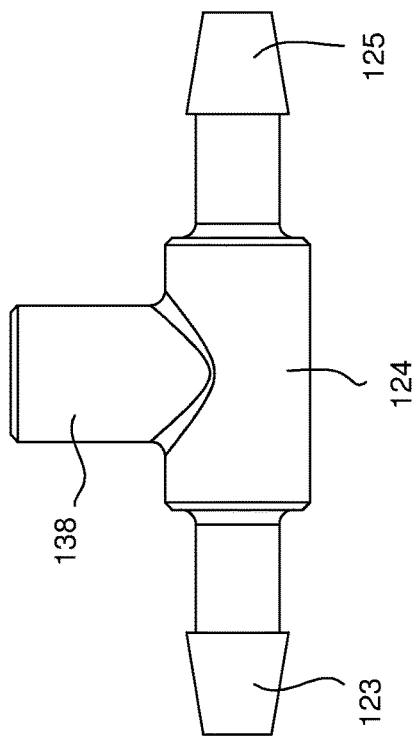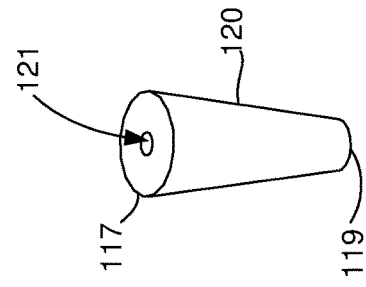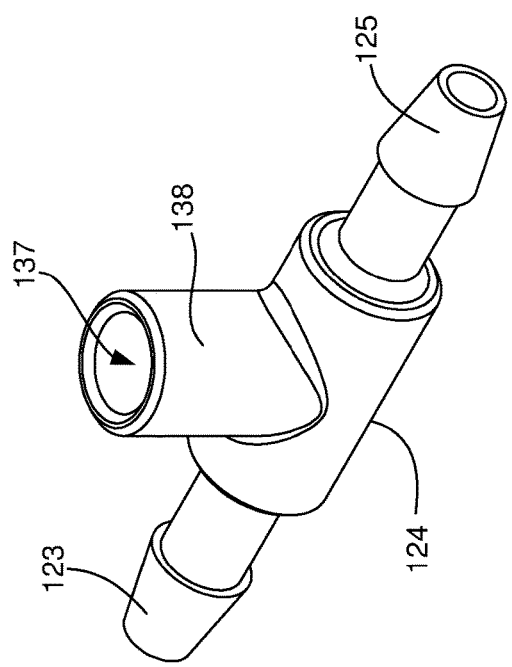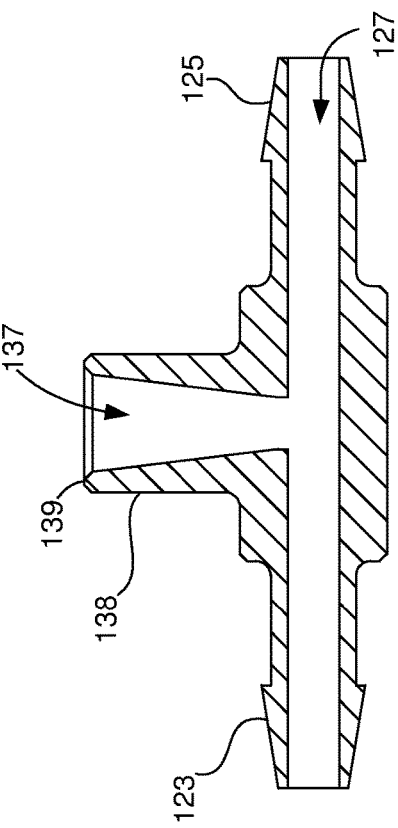

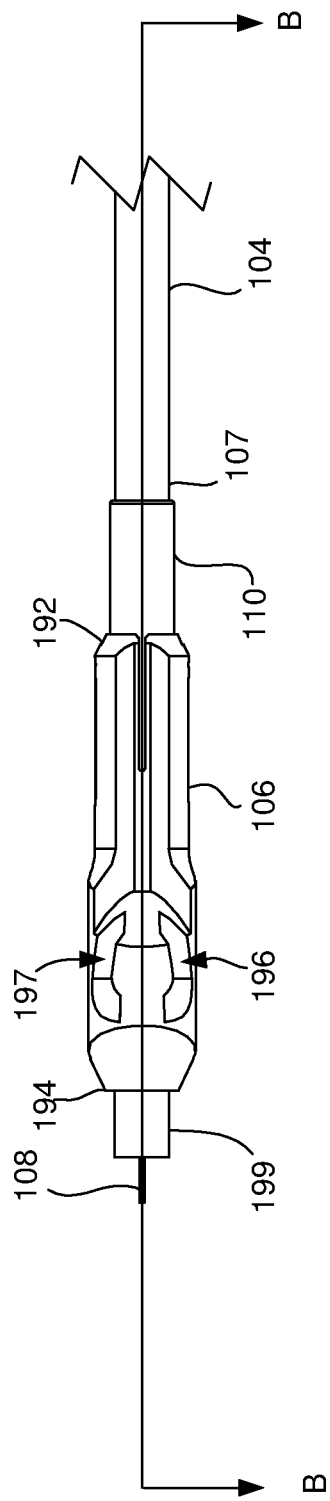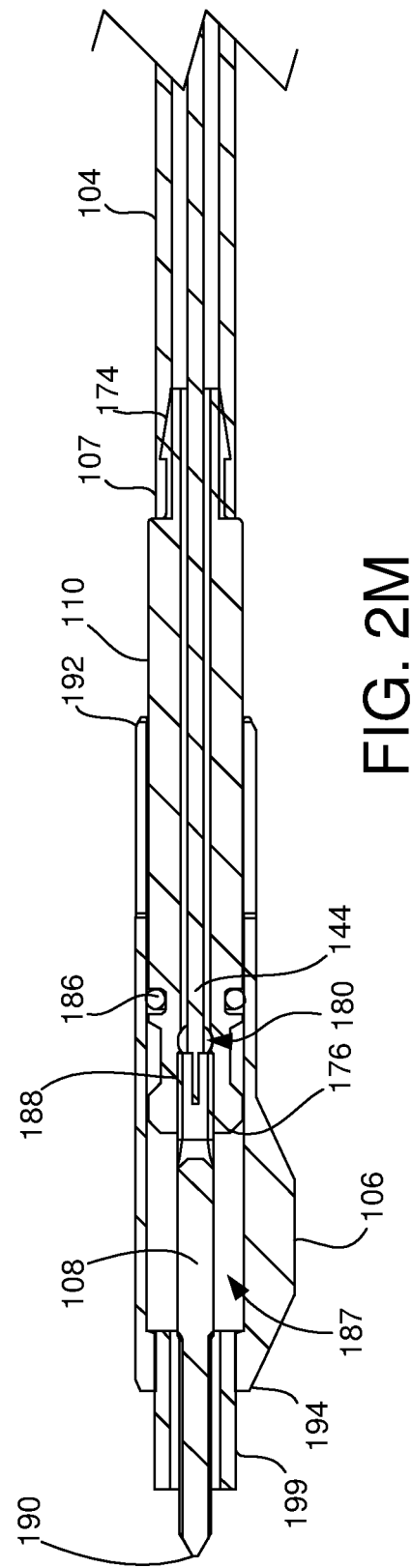

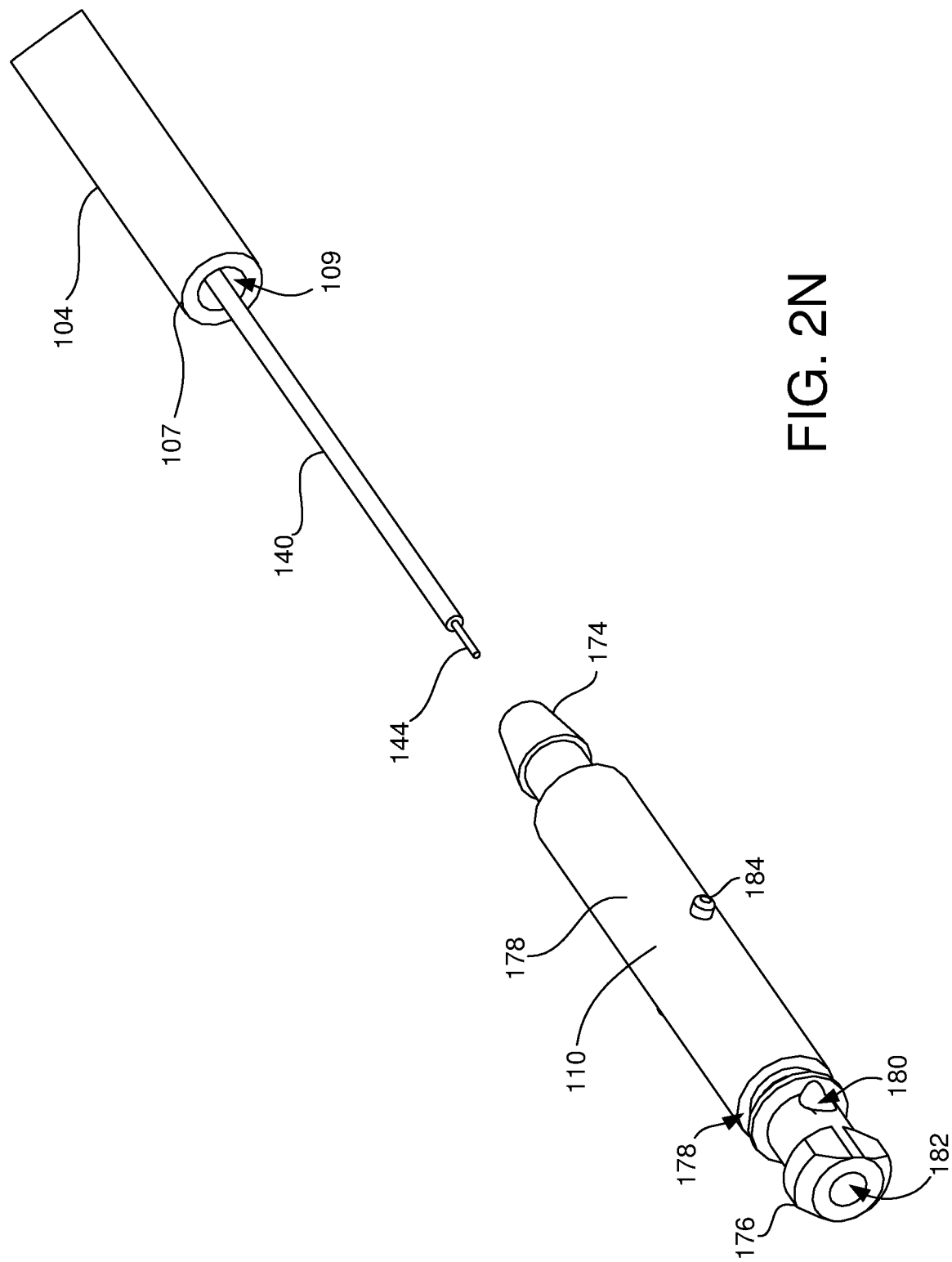

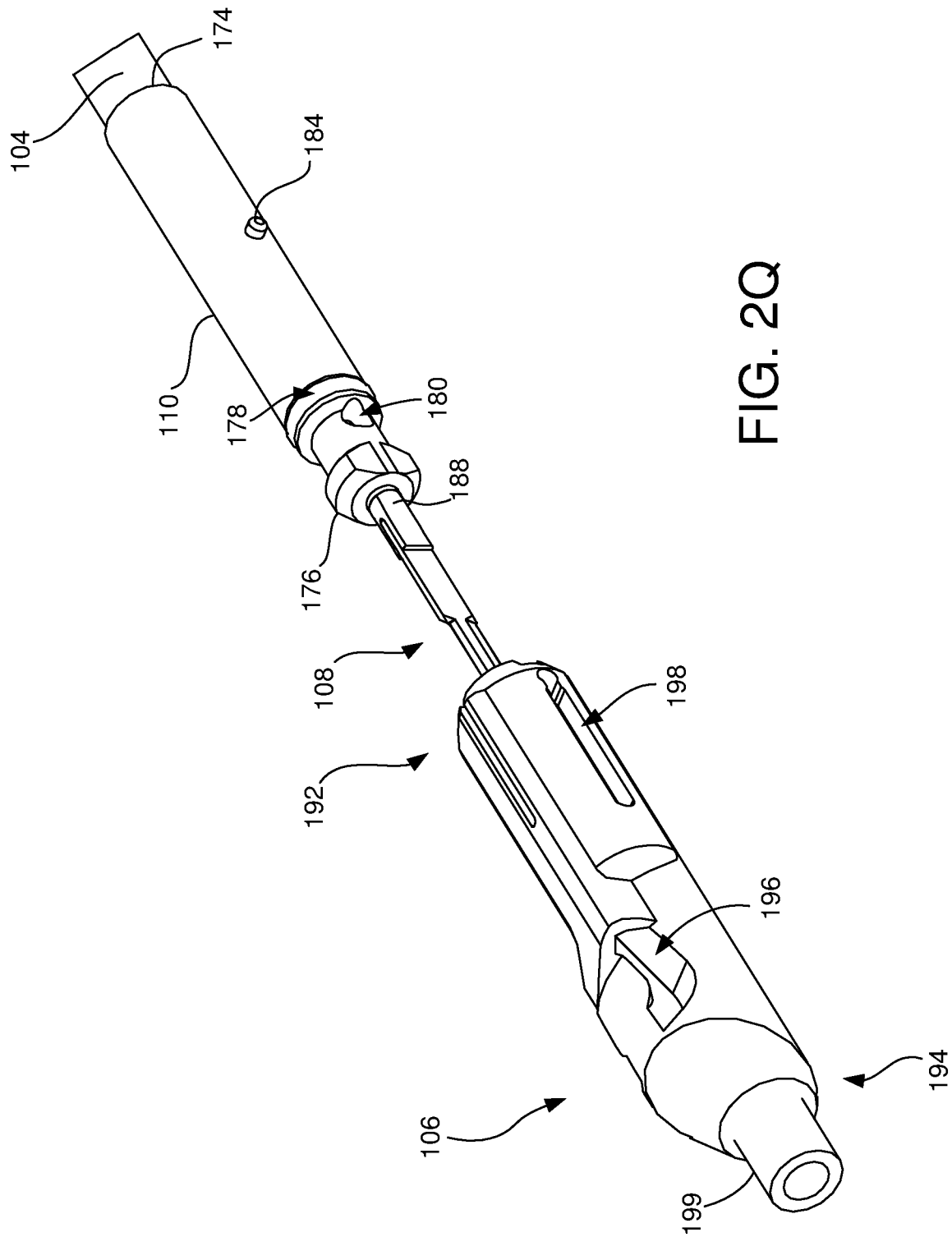

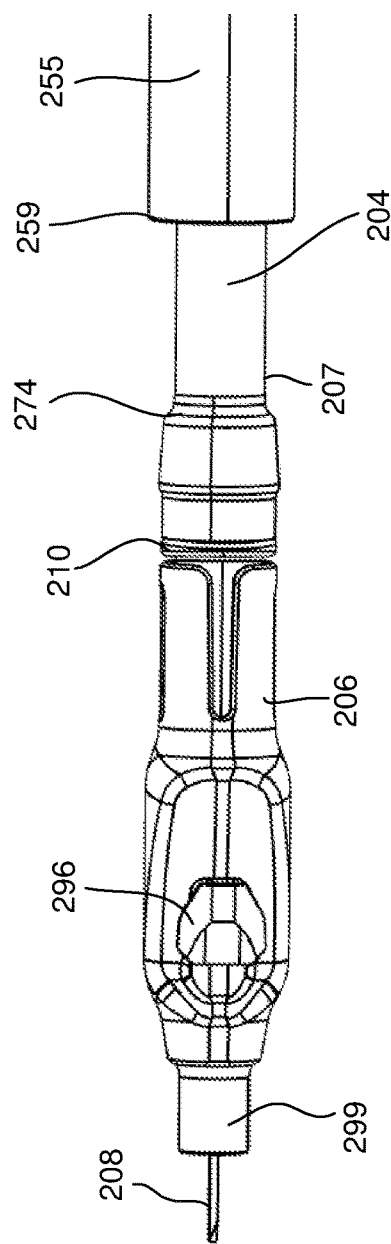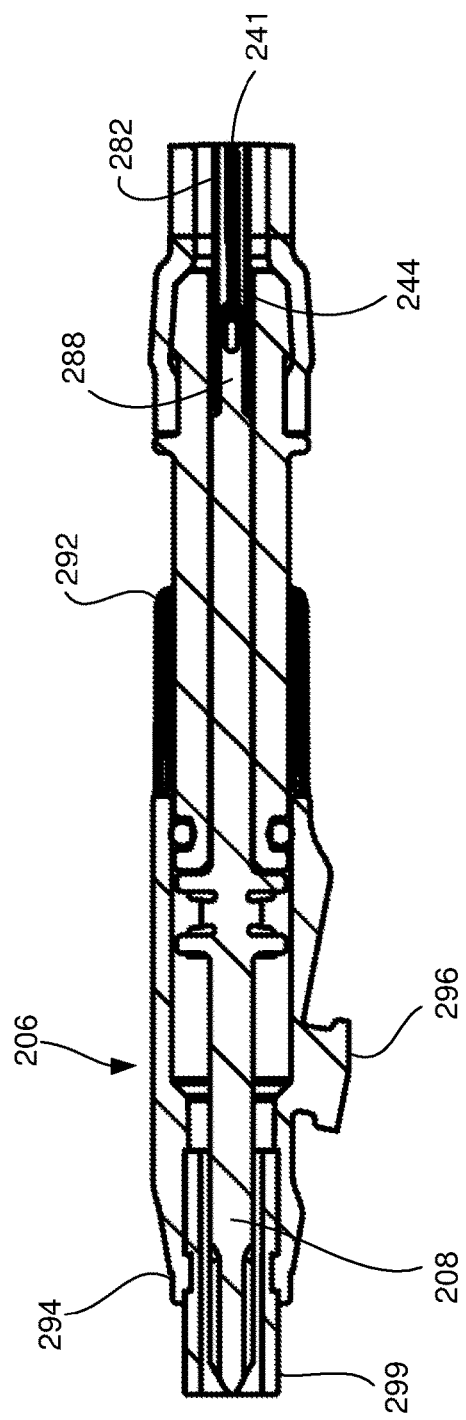

ELECTROSURGICAL APPARATUS WITH FLEXIBLE SHAFT

PRIORITY

This application claims priority to U.S. Provisional Patent Application Ser. No. 62/981,558, filed Feb. 26, 2020, entitled "ELECTROSURGICAL APPARATUS WITH FLEXIBLE SHAFT", the contents of which are hereby incorporated by reference in its entirety.

BACKGROUND

Field

The present disclosure relates generally to electrosurgery and electrosurgical systems and apparatuses, and more particularly, to an electrosurgical apparatus with a flexible shaft and a retractable sheath for exposing or covering an electrode, e.g., an electrosurgical blade, needle, etc., for use in cold plasma applications, electrosurgical cutting and mechanical cutting.

Description of the Related Art

High frequency electrical energy has been widely used in surgery and is commonly referred to as electrosurgical energy. Tissue is cut and bodily fluids are coagulated using electrosurgical energy.

Electrosurgical instruments generally comprise "monopolar" devices or "bipolar" devices. Monopolar devices comprise an active electrode on the electrosurgical instrument with a return electrode attached to the patient. In monopolar electrosurgery, the electrosurgical energy flows through the active electrode on the instrument through the patient's body to the return electrode. Such monopolar devices are effective in surgical procedures where cutting and coagulation of tissue are required and where stray electrical currents do not pose a substantial risk to the patient.

Bipolar devices comprise an active electrode and a return electrode on the surgical instrument. In a bipolar electrosurgical device, electrosurgical energy flows through the active electrode to the tissue of a patient through a short distance through the tissue to the return electrode. The electrosurgical effects are substantially localized to a small area of tissue that is disposed between the two electrodes on the surgical instrument. Bipolar electrosurgical devices have been found to be useful with surgical procedures where stray electrical currents may pose a hazard to the patient or where other procedural concerns require close proximity of the active and return electrodes. Surgical operations involving bipolar electrosurgery often require methods and procedures that differ substantially from the methods and procedures involving monopolar electrosurgery.

Gas plasma is an ionized gas capable of conducting electrical energy. Plasmas are used in surgical devices to conduct electrosurgical energy to a patient. The plasma conducts the energy by providing a pathway of relatively low electrical resistance. The electrosurgical energy will follow through the plasma to cut, coagulate, desiccate, or fulgurate blood or tissue of the patient. There is no physical contact required between an electrode and the tissue treated.

Electrosurgical systems that do not incorporate a source of regulated gas can ionize the ambient air between the active electrode and the patient. The plasma that is thereby created will conduct the electrosurgical energy to the patient, although the plasma arc will typically appear more spatially dispersed compared with systems that have a regulated flow of ionizable gas.

Atmospheric pressure discharge cold plasma applicators have found use in a variety of applications including surface sterilization, hemostasis, and ablation of tumors. Often, a simple surgical knife is used to excise the tissue in question, followed by the use of a cold plasma applicator for cauterization, sterilization, and hemostasis. Cold plasma beam applicators have been developed for both open and endoscopic procedures. In the latter case, it is often desirable to be able to redirect the position of the cold plasma beam tip to a specific operative site. The external incision and pathway for the endoscopic tool may be chosen to avoid major blood vessels and non-target organs, and may not coincide with an optimum alignment for the target internal tissue site. A means of redirecting the cold plasma beam is essential in these situations.

Elaborate mechanisms have been developed to change the direction of the plasma beam by the surgeon as needed. However, these mechanisms are mechanically complicated, expensive to produce and, in some cases, unwieldy to operate effectively. The small diameter of the endoscopic trocar through which the surgical tool, e.g., a plasma applicator, must be inserted places even more severe restrictions on these issues.

SUMMARY

In one aspect of the present disclosure, an electrosurgical apparatus is provided. The electrosurgical apparatus of the present disclosure includes a connector, a flexible shaft, and a distal tip. The connector is configured to be coupled to an electrosurgical generator and gas supply. The distal tip of the electrosurgical apparatus is configured to be grasped by a grasping tool, such as forceps, such that, the orientation of the distal tip of the electrosurgical apparatus may be manipulated about the flexible shaft in a plurality of ways. The electrosurgical apparatus is configured to provide electrosurgical energy and inert gas to an electrode within the distal tip of the electrosurgical apparatus to generate a plasma beam.

In one aspect, the distal tip is configured as a sheath that is extendable and retractable over the electrode to expose the electrode when the sheath is in a first position and conceal or cover the electrode when the sheath is in a second position. In one aspect, the electrode is configured as a conducting blade, such that the electrosurgical apparatus is configured for use in mechanical and electrosurgical cutting during surgery when the sheath is in a first position, i.e., the electrode is exposed, and for cold plasma applications during surgery when the sheath is in a second position, i.e., the electrode is concealed or covered.

According to one aspect of the present disclosure, an electrosurgical apparatus includes a connector including a proximal end and a distal end, the proximal end of the connector configured to receive electrosurgical energy and a gas supply; a flexible insulating outer tube including a proximal end and a distal end, the proximal end of the flexible insulating outer tube coupled to the distal end of the connector; a distal tip including a proximal end and a distal end, the proximal end of the distal tip coupled to the distal end of the flexible insulating outer tube, the distal tip including an electrode, the distal tip configured as a sheath that is retractable and extendable over the electrode to expose the electrode when the sheath is in a first position and conceal or cover the electrode when the sheath is in a second position; and a flexible electrically conducting member disposed through the flexible insulating outer tube and including a proximal end and a distal end, the distal end of the flexible electrically conducting member coupled to the electrode and configured to provide electrosurgical energy thereto; wherein the flexible insulating outer tube and the flexible electrically conducting member are configured to enable the distal tip to achieve a plurality of positions relative to the flexible insulating outer tube.

In one aspect, the electrosurgical apparatus further includes at least one memory disposed in the connector, the at least one memory stores information related to use of the electrosurgical apparatus.

In another aspect, the electrosurgical apparatus further includes a coupler disposed in the connector and including a proximal end and distal end, the proximal end configured to receive the gas supply and distal end configured to be coupled to the proximal end of the flexible insulating outer tube, a fluid channel extends from the proximal end to the distal end of the coupler, the coupler further includes an extension member that extends perpendicularly away from the fluid channel and is configured to receive the flexible conducting member and provide the flexible conducting member to the flexible insulating outer tube.

In a further aspect, the electrosurgical apparatus further includes a plug configured to be disposed in the extension member of the coupler, the plug including a channel to receive the flexible conducting member such that when the flexible conductor member is disposed through the channel of the plug the received gas is prevented from leaking into the connector.

In yet another aspect, the electrosurgical apparatus further includes a cap configured to be disposed over the extension member to prevent the plug from being removed, the cap including at least one slot to securely mate to the coupler.

In still another aspect, the electrosurgical apparatus further includes an electrode coupler including a proximal end and a distal end, the proximal end of the electrode coupler coupled to the distal end of the flexible insulating outer tube, the distal end of the electrode coupler configured to support the electrode, the sheath being slidingly disposed over the distal end of the electrode coupler.

In one aspect, the electrode coupler further includes at least one tab disposed on an outer wall and the sheath includes at least one tab slot for receiving the at least one tab such that sheath is extendable and retractable over the electrode coupler.

In another aspect, the electrode coupler includes at least one aperture through a side wall proximately to distal end of the electrode coupler, where when gas is provided via the flexible insulating outer tube to the electrode coupler, the gas exits via the at least one aperture into an interior of sheath, flows over the electrode and exits through the distal end of the sheath.

In a further aspect, the distal tip is configured to be grasped by a grasping tool to manipulate the position of the distal tip relative to the flexible insulating outer tube.

In one aspect, the distal tip includes a first grasping slot and a second grasping slot, the first and second grasping slots configured to enable the grasping tool to grasp the distal tip.

In another aspect, the distal tip includes a grasping member that extends away from an outer surface of the distal tip, the grasping member configured to enable the grasping tool to grasp the distal tip.

In yet another aspect, the electrode is configured as an electrically conducting needle.

In a further aspect, the electrode is configured as an electrically conducting blade.

According to a further aspect of the present disclosure, wherein in a first position of the distal tip, the electrode extends beyond the distal end of the distal tip for cutting, and, in a second position of the distal tip, the electrode is retracted within the distal tip and is energized via the flexible electrically conducting member to form plasma when an inert gas is provided to the distal tip.

In one aspect, the electrosurgical apparatus further includes an introducer including a rigid tube portion disposed on the flexible insulating outer tube and slidable along the flexible insulating outer tube between the connector and distal end, wherein the rigid tube portion maintains a portion of the flexible insulating outer tube that the rigid tube portion is disposed upon in a linear position.

In another aspect, the electrosurgical apparatus further includes a conductive tube coupler disposed in the connector and including a proximal end and distal end, the proximal end of the conductive tube coupler configured to receive the gas supply and the distal end of the conductive tube coupler configured to be coupled to the proximal end of the flexible insulating outer tube, a fluid channel extends from the proximal end of the conductive tube coupler to the distal end of the conductive tube coupler and provides inert gas to flexible insulating outer tube, the distal end of the conductive tube coupler coupled to the flexible conductive member disposed in the flexible insulating outer tube.

In still another aspect, the electrosurgical apparatus further includes a conductive clip configured to be disposed over a portion of the conductive tube coupler, the clip being coupled to a wire for receiving the electrosurgical energy, the electrosurgical energy being provided via the clip, the conductive tube coupler and the flexible conductive member to the electrode.

In a further aspect, the electrode includes at least one tab disposed in a central portion of electrode and the electrode coupler includes at least one recess, wherein the at least one tab aligns with the at least one recess and the at least one tab is bent into the at least one recess to secure the electrode.

In one aspect, the distal end of the electrode coupler further includes two slots diametrically opposed on an interior of the electrode coupler, wherein the slots are configured to receive the at least one tab of the electrode to secure the electrode laterally.

In yet another aspect, the electrosurgical apparatus further includes a cylindrical ceramic tube coupled to the distal end of the sheath, wherein when the sheath is in the first position, the distal end of the electrode extends passed the ceramic tube and, when the sheath is in the second position, the distal end of the electrode is covered by the ceramic tube.

BRIEF DESCRIPTION OF THE DRAWINGS

The above and other aspects, features, and advantages of the present disclosure will become more apparent in light of the following detailed description when taken in conjunction with the accompanying drawings in which:

FIG. 2F is a perspective view of a coupler of electrosurgical apparatus of FIG. 2A in accordance with the present disclosure;

FIG. 2G is a side view of the coupler of FIG. 2F in accordance with the present disclosure;

FIG. 2H is a side cross-sectional view the coupler of FIG. 2F in accordance with the present disclosure;

FIG. 2I is perspective view a tapered plug of the electrosurgical apparatus of FIG. 2A in accordance with the present disclosure;

FIG. 2L is side view of the distal portion of the electrosurgical apparatus of FIG. 2A in accordance with the present disclosure;

FIG. 2M is a side cross-sectional view of the distal portion of the electrosurgical apparatus taken along line B-B of FIG. 2L in accordance with the present disclosure;

FIG. 2N is an exploded perspective view of several components of the distal portion of the electrosurgical apparatus of FIG. 2A in accordance with the present disclosure;

FIG. 2Q is an exploded perspective view of the distal portion of the electrosurgical apparatus of FIG. 2A in accordance with the present disclosure;

FIG. 6A is side view of a distal portion of the electrosurgical apparatus of FIG. 4A in accordance with the present disclosure;

FIG. 6B is a side cross-sectional view of the distal portion of the electrosurgical apparatus of FIG. 4A in accordance with the present disclosure;

Figure 1:
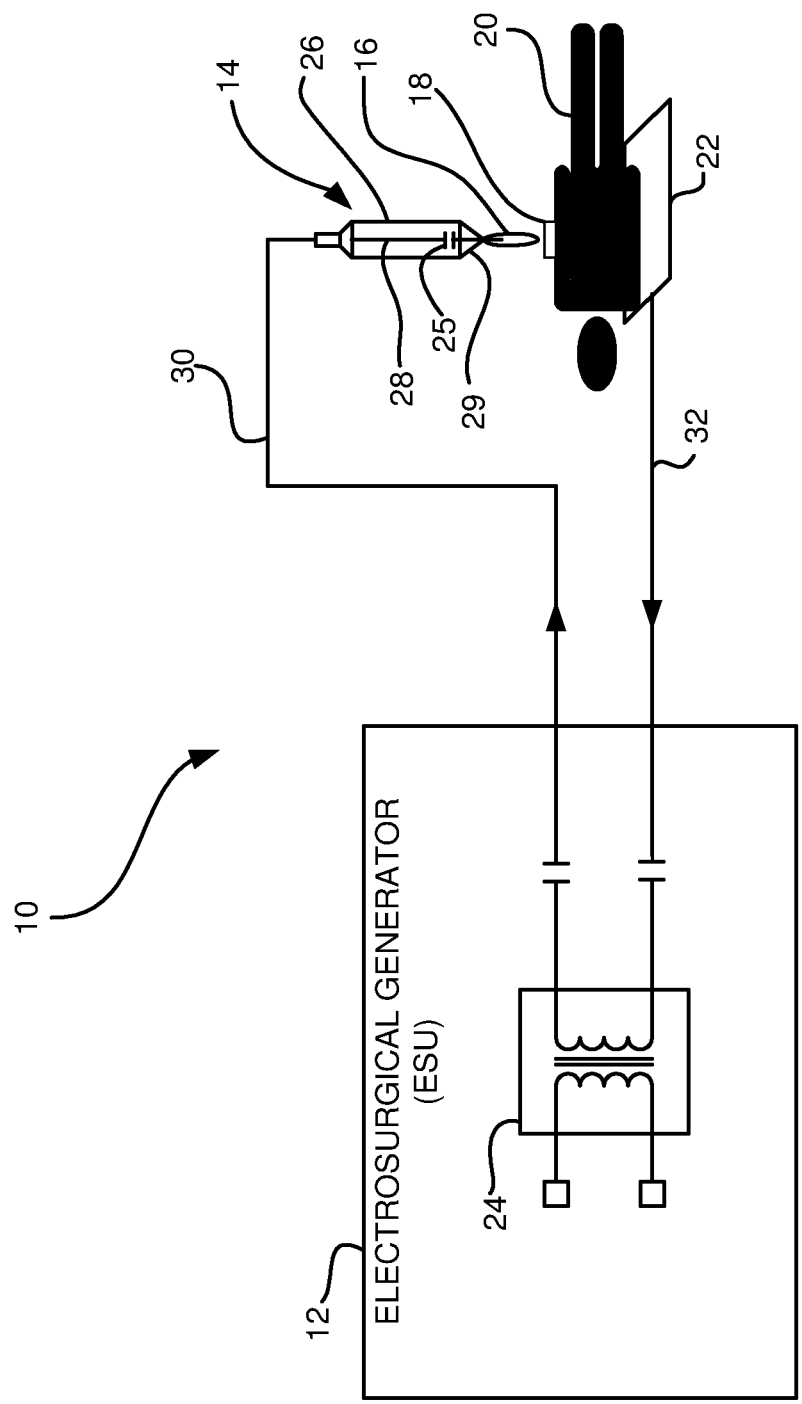
FIG. 1 is an illustration of an exemplary monopolar electrosurgical system in accordance with an embodiment of the present disclosure.

It should be understood that the drawings are for purposes of illustrating the concepts of the disclosure and are not necessarily the only possible configuration for illustrating the disclosure.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail. In the drawings and in the description which follow, the term "proximal", as is traditional, will refer to the end of the device, e.g., instrument, apparatus, applicator, handpiece, forceps, etc., which is closer to the user, while the term "distal" will refer to the end which is further from the user. Herein, the phrase "coupled" is defined to mean directly connected to or indirectly connected with through one or more intermediate components. Such intermediate components may include both hardware and software based components.

The present disclosure is directed to an electrosurgical apparatus. The electrosurgical apparatus of the present disclosure includes a connector, a flexible shaft, and a distal tip. The connector is configured to be coupled to an electrosurgical generator and gas supply. The distal tip of the electrosurgical apparatus is configured to be grasped by a grasping tool, such as forceps, such that, the orientation of the distal tip of the electrosurgical apparatus may be manipulated about the flexible shaft in a plurality of ways. The electrosurgical apparatus is configured to provide electrosurgical energy and inert gas to an electrode within the distal tip of the electrosurgical apparatus to generate a plasma beam. In one embodiment, the distal tip is configured as a sheath that is extendable and retractable over the electrode to expose the electrode when the sheath is in a first position and conceal or cover the electrode when the sheath is in a second position. In one aspect, the electrode is configured as a conducting blade, such that the electrosurgical apparatus is configured for use in mechanical and electrosurgical cutting during surgery when the sheath is in a first position, i.e., the electrode is exposed and for cold plasma applications during surgery when the sheath is in a second position, i.e., the electrode is concealed or covered.

FIG. 1 shows an exemplary monopolar electrosurgical system generally indicated as 10 comprising an electrosurgical generator (ESU) generally indicated as 12 to generate power for the electrosurgical apparatus 10 and a plasma generator generally indicated as 14 to generate and apply a plasma stream 16 to a surgical site or target area 18 on a patient 20 resting on a conductive plate or support surface 22. The electrosurgical generator 12 includes a transformer generally indicated as 24 including a primary and secondary coupled to an electrical source (not shown) to provide high frequency electrical energy to the plasma generator 14. Typically, the electrosurgical generator 12 comprises an isolated floating potential not referenced to any potential. Thus, current flows between the active and return electrodes. If the output is not isolated, but referenced to "earth", current can flow to areas with ground potential. If the contact surface of these areas and the patient is relatively small, an undesirable burning can occur.

The plasma generator 14 comprises a handpiece or holder 26 having an electrode 28 at least partially disposed within a fluid flow housing 29 and coupled to the transformer 24 to receive the high frequency electrical energy therefrom to at least partially ionize noble gas fed to the fluid flow housing 29 of the handpiece or holder 26 to generate or create the plasma stream 16. The high frequency electrical energy is fed from the secondary of the transformer 24 through an active conductor 30 to the electrode 28 (collectively active electrode) in the handpiece 26 to create the plasma stream 16 for application to the surgical site 18 on the patient 20. Furthermore, in some embodiments, a current limiting capacitor 25 is provided in series with the electrode 28 to limit the amount of current being delivered to the patient 20.

The return path to the electrosurgical generator 12 is through the tissue and body fluid of the patient 20, the conductor plate or support member 22 and a return conductor 32 (collectively return electrode) to the secondary of the transformer 24 to complete the isolated, floating potential circuit.

In another embodiment, the electrosurgical generator 12 comprises an isolated non-floating potential not referenced to any potential. The plasma current flow back to the electrosurgical generator 12 is through the tissue and body fluid and the patient 20. From there, the return current circuit is completed through the combined external capacitance to the plasma generator handpiece 26, surgeon and through displacement current. The capacitance is determined, among other things, by the physical size of the patient 20. Such an electrosurgical apparatus and generator are described in commonly owned U.S. Pat. No. 7,316,682 to Konesky, the contents of which are hereby incorporated by reference in its entirety.

It is to be appreciated that transformer 24 may be disposed in the plasma generator handpiece 26. In this configuration, other transformers may be provided in the generator 12 for providing a proper voltage and current to the transformer in the handpiece 26, e.g., a step-down transformer, a step-up transformer or any combination thereof.

In one embodiment of the present disclosure, a plasma generator handpiece or electrosurgical apparatus is provided including a flexible shaft, such the orientation of the distal tip of the electrosurgical apparatus may be manipulated about the flexible shaft in a plurality of ways to direct a generated plasma beam in various directions.

Figure 2A:
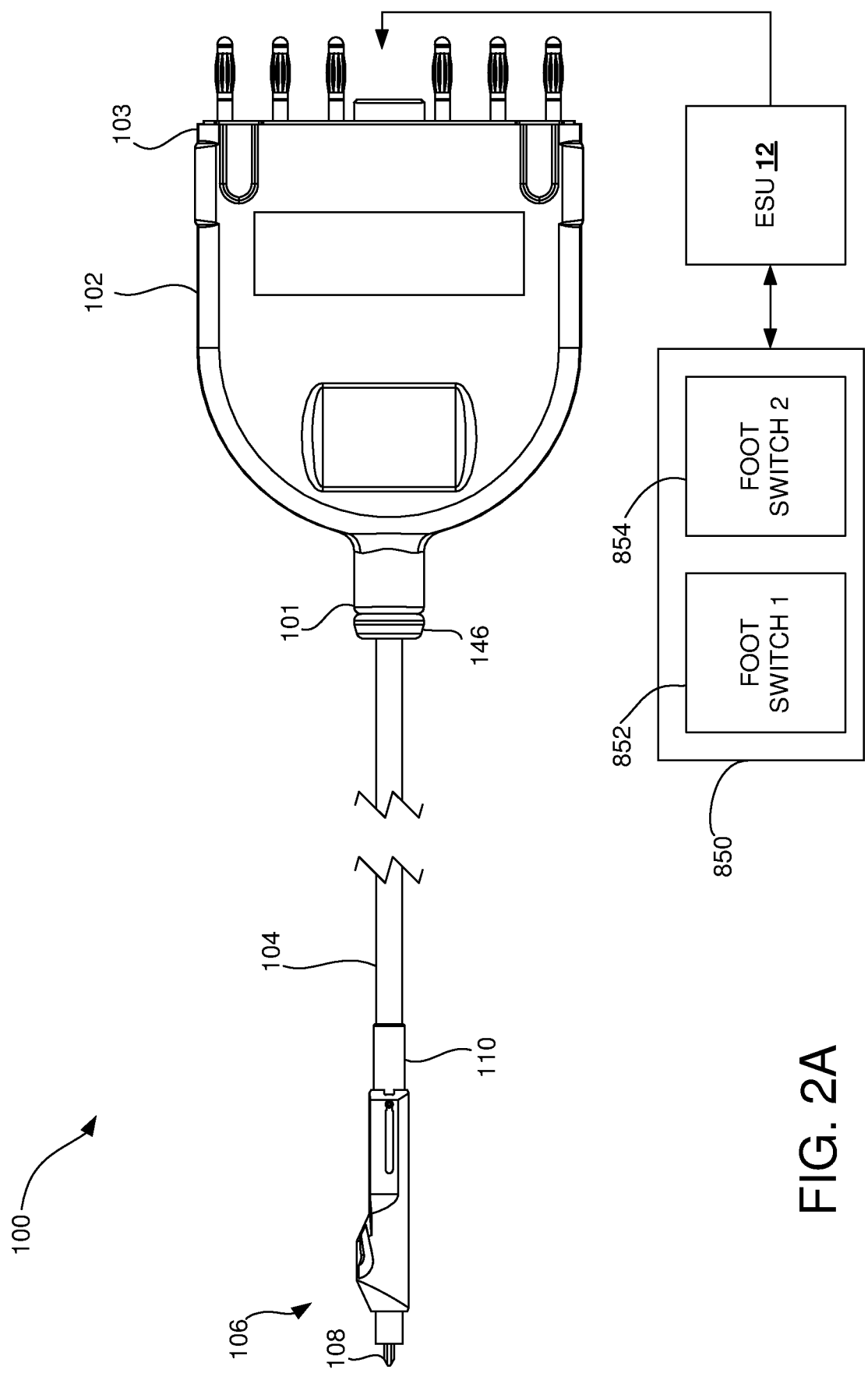
FIG. 2A is a side view of an electrosurgical apparatus in accordance with an embodiment of the present disclosure.

For example, referring to FIG. 2A, an electrosurgical apparatus 100 including a flexible, insulating shaft 104 is shown in accordance with an embodiment of the present disclosure. Apparatus 100 includes a connector or plug 102, flexible shaft or flow tube 104, electrode coupler 110, distal tip 106, and electrode 108.

Figure 2B:
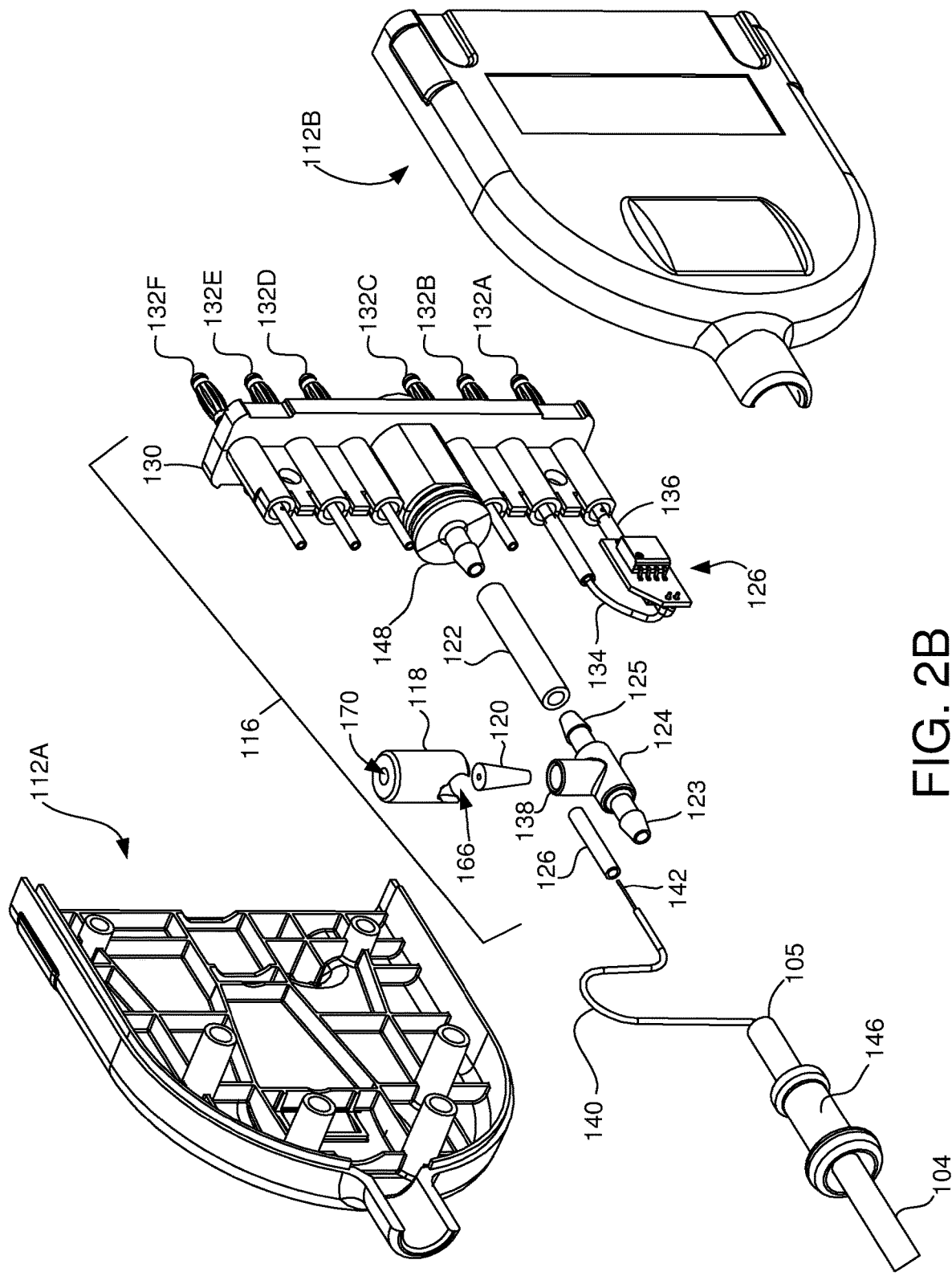
FIG. 2B is an exploded perspective view of a proximal portion of the electrosurgical apparatus of FIG. 2A in accordance with the present disclosure.
Figure 2C:
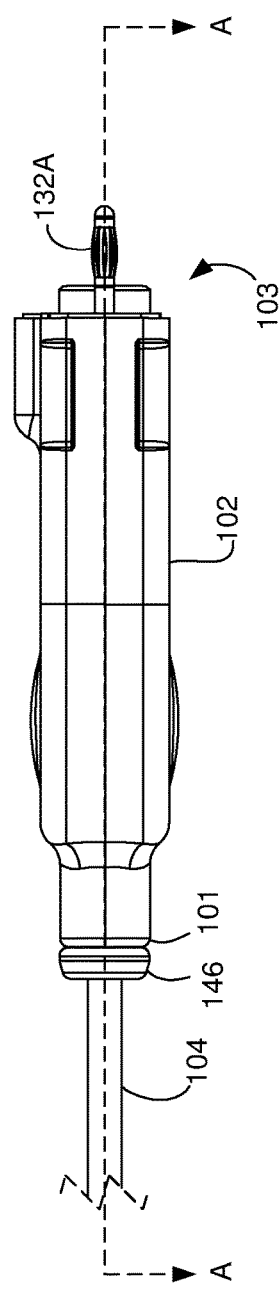
FIG. 2C is side view of the proximal portion of the electrosurgical apparatus of FIG. 2A in accordance with the present disclosure.
Figure 2D:
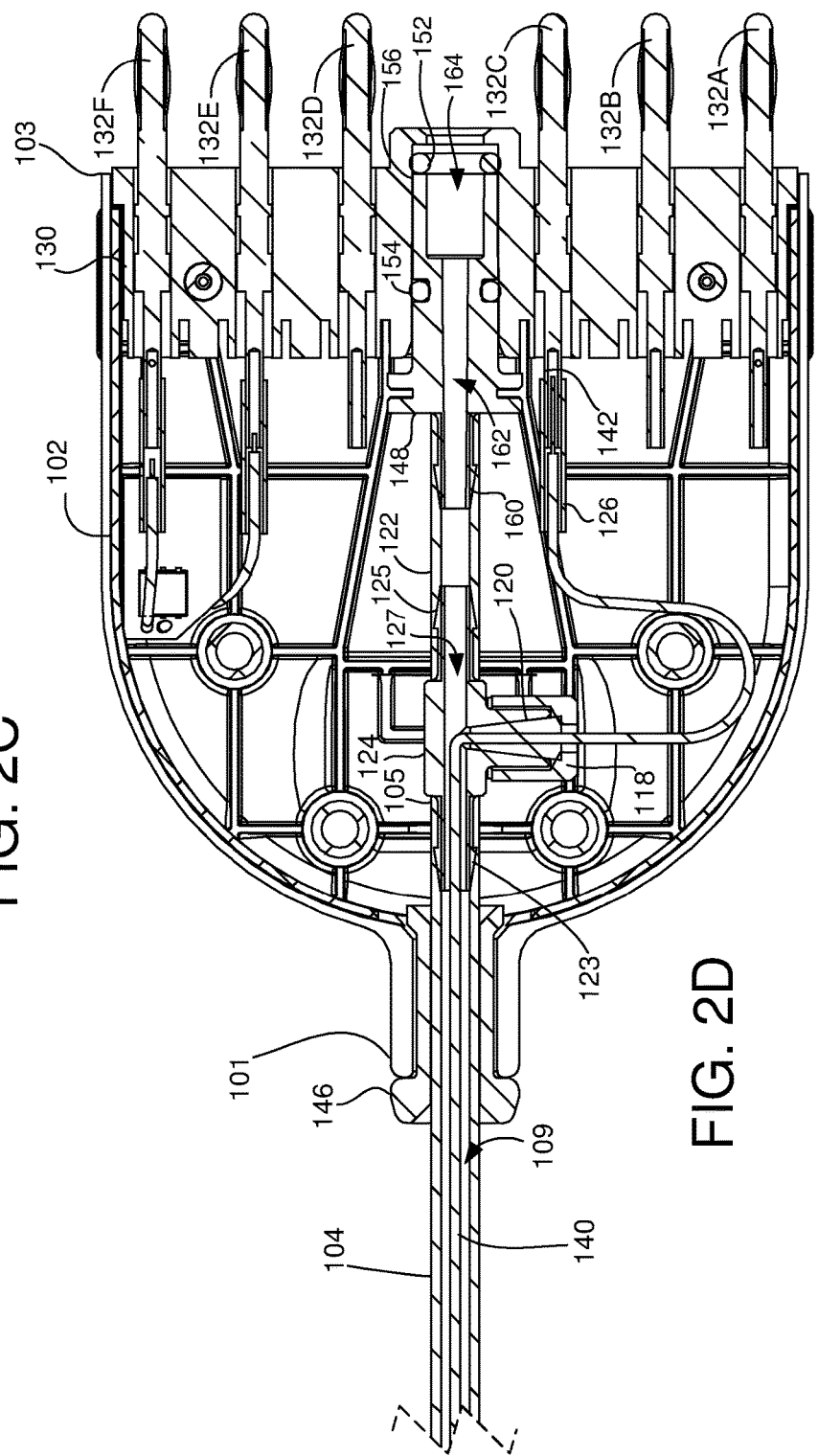
FIG. 2D is a side cross-sectional view of the proximal portion of the electrosurgical apparatus taken along line A-A of FIG. 2C in accordance with the present disclosure.

Referring to FIGS. 2B-2E, a proximal portion of apparatus 100 is shown in accordance with an embodiment of the present disclosure, where, in FIG. 2B, an exploded perspective view of the proximal portion is shown, in FIG. 2C, a side view of the proximal portion is shown, and, in FIG. 2D, a side cross-section view along lines A-A (indicated in FIG. 2C) is shown. The proximal portion of apparatus 100 includes connector 102, which includes distal end 101 and proximal end 103 (best seen in FIGS. 2C, 2D).

Connector 102 is configured to couple apparatus 100 to an electrosurgical generator, such as ESU 12 for receiving electrosurgical energy and fluid (e.g., an inert gas, such as helium or argon) for use in procedures performed using apparatus 100, as will be described in greater detail below.

Connector 102 includes shells 112A, 112B, which, when coupled together, form a housing for connector 102. Between shells 112A, 112B, connector 102 includes an interior, where a sub-assembly 116 of connector 102 is disposed in the interior. Sub-assembly 116 includes conductors 132A-F, base 130, processor and/or memory 128, tube coupler 148, fluid tube 122, tube coupler 124, plug or seal 120, cap 118, and sleeve 126.

Figure 2E:
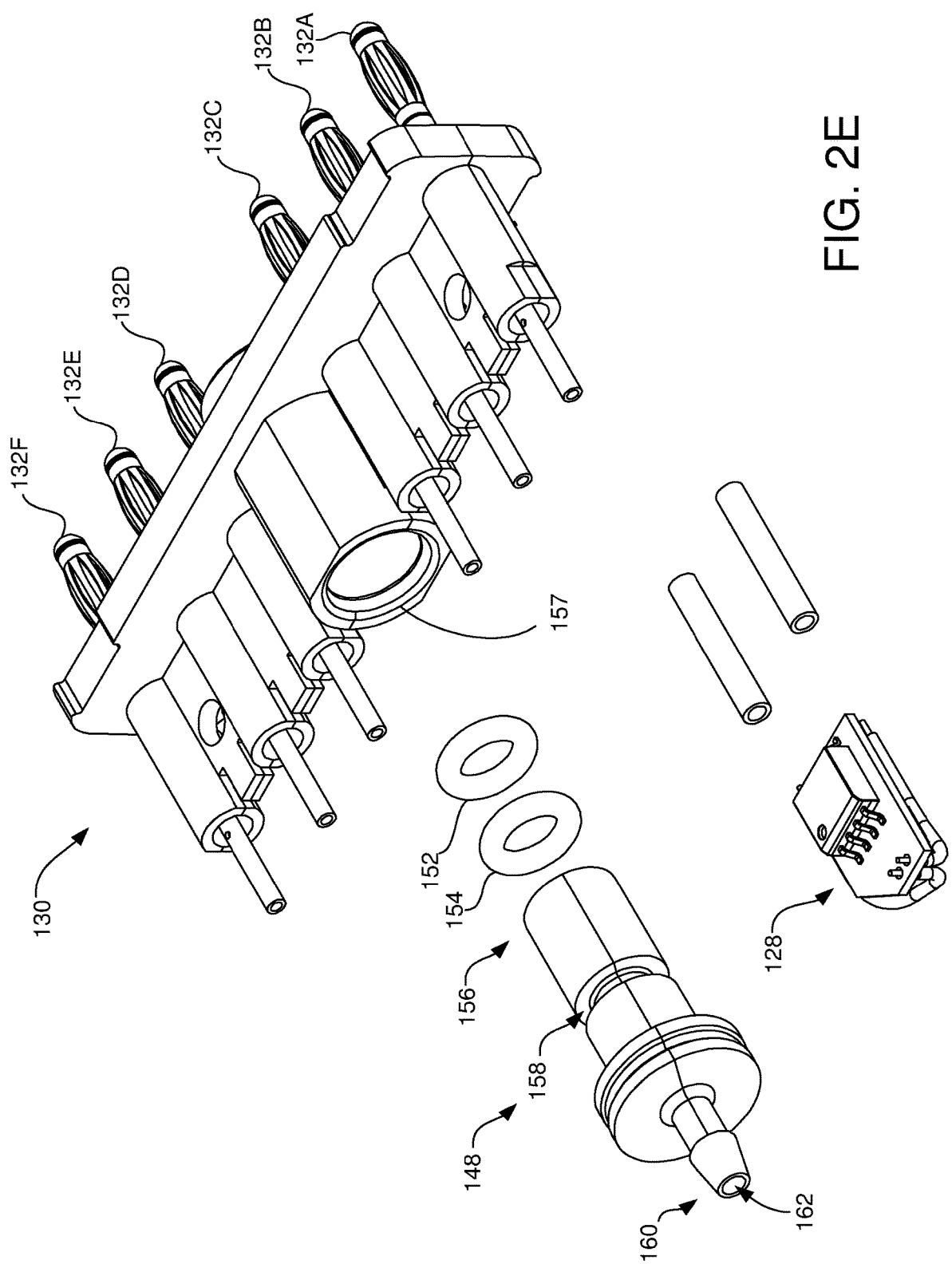
FIG. 2E is an exploded perspective view of a connector sub-assembly of the electrosurgical apparatus of FIG. 2A in accordance with the present disclosure.

Referring to FIG. 2E an exploded perspective view of base 130, coupler 148, and processor and/or memory 128 is shown in accordance with the present disclosure. As shown in FIG. 2E, conductors 132A-132F are disposed through and mounted to base 130 such that conductors 132A-132F project distally and proximally from either side of base 130. Conductors 132A, 132B are coupled to processor and/or memory 128 to form a circuit via which an electrosurgical generator (e.g., ESU 12) can communicate with when connector 102 is coupled to a corresponding receptacle of the electrosurgical generator. In one embodiment, processor and/or memory 128 is an electrically erasable programmable read-only memory (EEPROM) that stores information (e.g., settings, parameters, etc., associated with apparatus 100) that may be read by the electrosurgical generator to use apparatus 100. For example, memory 128 may store information related to recommended flow rates of inert gas provided to apparatus 100, properties of electrosurgical energy to be provided to apparatus 100, time information used by ESU 12 to disable ESU 12 after a predetermined amount of time apparatus 100 has been used for (e.g., 12 hours), etc. It is to be appreciated that additional information and/or only a subset of the above described information may be stored in memory 128.

Coupler 148 includes a proximal end 156 and a distal end 160. A fluid channel or lumen 162 extends from end 160 toward end 156 within the interior of coupler 148. Distal end 160 is configured as a conic portion or male coupling member. As best seen in FIG. 2D, end 156 of coupler 148 includes an opening or channel 164, which is in fluid communication with channel 162 and is configured to receive an inert gas from the electrosurgical generator when connector 102 is coupled thereto. Distal end 160 is configured to be inserted into a proximal end of tube 122, such that inert gas is provided from opening 164 and channel 162 into the interior lumen or channel of tube 122. Referring to FIGS. 2D and 2E, the proximal end 156 of coupler 148 is disposed through a channel or mounting portion 157 of base 130 and mounted to base 130. Coupler 148 includes a circular slot 158 disposed around the exterior of coupler 148 and configured to receive a first o-ring 154. As shown in FIG. 2D, when coupler 148 is mounted to base 130, the first o-ring 154 is disposed in slot 158 and between coupler 148 and an interior wall of base 130. A second o-ring 152 is disposed against proximal end 156 of coupler 148. O-rings 152, 154 are configured to seal coupler 148 and prevent gas leakage when inert gas is provided to coupler 148.

As best seen in FIGS. 2B and 2D, tube 122 is further coupled to a proximal end 125 of tube coupler 124. Referring to FIGS. 2F-2H, coupler 124 is shown in greater detail in accordance with the present disclosure. Coupler 124 includes proximal end 125 and distal end 123, where ends 123, 125 are each configured in a conic shape as male coupling members for coupling to fluid tubes. End 125 is configured to be inserted into and coupled to the distal end of tube 122 and end 123 is configured to be inserted into and coupled to the proximal end 105 of fluid tube or shaft 104 (as shown in FIG. 2D). A fluid channel or lumen 127 extends from end 123 to end 125 and carries inert gas provided via tube 122 to fluid channel or lumen 109 (shown in FIG. 2D) of shaft 104.

Coupler 124 further includes an extension member 138, which extends perpendicularly away from channel 127. Member 138 includes an open end 139, which reveals a conic or frustoconical slot or channel 137, which includes a diameter that converges from end 139 toward the central portion of channel 127. Channel or slot 137 is configured to receive a tapered sealing plug 120 shown in FIGS. 2B, 2D, and 2I. As shown in FIG. 2I, tapered plug 120 includes ends 117, 119 and is shaped like a frustrum of a cone. The shape of tapered plug 120 is configured to match that shape of slot 137, such that plug 120 prevents inert gas from leaking from channel 127 into slot 137. Plug 120 includes a channel 121 (shown in FIG. 2I) that extends from end 117 to end 119 and includes a diameter with the approximate thickness of the exterior of wire 140. Referring to FIG. 2D, channel 121 is configured to receive a portion of conductive wire 140. Wire 140 includes a proximal end 142, which is coupled to conductor 132C of connector 102 for receiving electrosurgical energy to be provided to electrode 108. An insulating cover or sheath 126 is disposed over an end of conductor 132C and the proximal end 142 of wire 140. Wire 140 is disposed through channel 121 (shown in FIG. 2I) of plug 120, into channel 127 of coupler 124, and into channel 109 of shaft 104. It is to be appreciated that the diameter of channel 121 is configured such that when wire 140 is disposed through channel 121, inert gas provided through channel or lumen 127 does not leak into and escape from channel 121.

It is further to be appreciated that wire 140 is a flexible electrically conducting member that when disposed in shaft 104, wire 140 will move and be contorted along with the flexible outer tube or shaft 104. The flexible electrically conducting member 140 may take other forms and still be within the scope of the present disclosure. For example, the flexible electrically conducting member 140 may include, but not limited to, a flexible electrically conducting rod, a flexible electrically conducting tube, a flexible electrically conducting spring, etc.

Figure 2K:
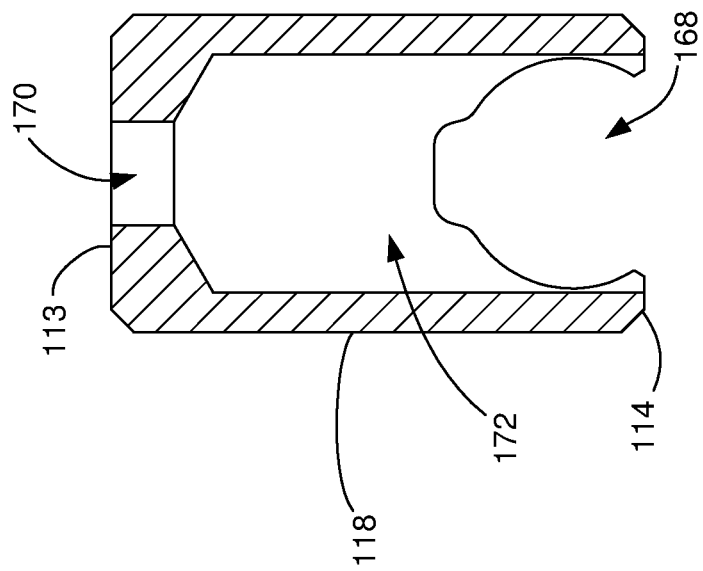
FIG. 2K is a side cross-sectional view of the cap of FIG. 2J in accordance with the present disclosure.
Figure 2J:
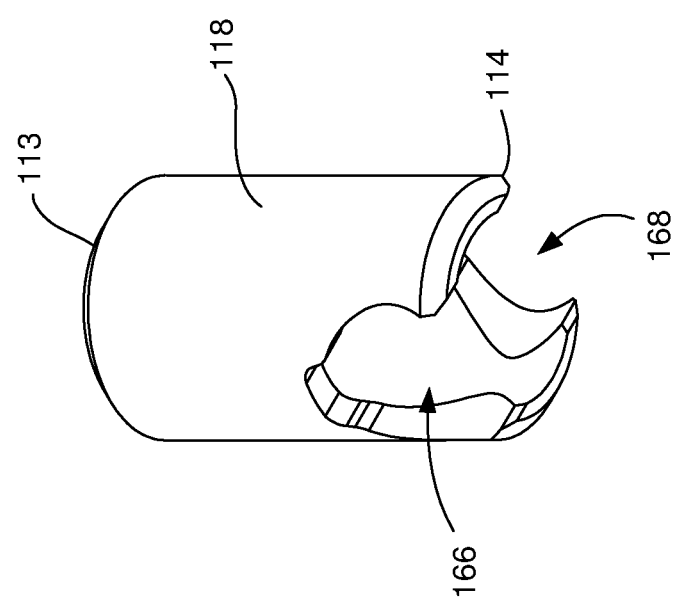
FIG. 2J is a perspective view of a cap of the electrosurgical apparatus of FIG. 2A in accordance with the present disclosure.

As shown in FIGS. 2B and 2D, sub-assembly 116 includes a cap 118 configured to be disposed over plug 120 and prevent plug 120 from being removed from slot 137 of coupler 124. Referring to FIGS. 2J and 2K, cap 118 is shown in greater detail in accordance with the present disclosure. Cap 118 is configured in a substantially cylindrical shape and includes ends 113, 114, where end 113 includes an aperture 170, which provides access to an interior 172 of cap 118. Open end 114 is configured to receive extension member 138 of coupler 124 into interior 172. The exterior wall of cap 118 includes two arced slots or apertures 166, 168 diametrically opposed around the exterior wall of cap 118. Slots 166, 168 are shaped and configured to snap onto the exterior of coupler 124, i.e., securely mate to the coupler 124, to prevent cap 118 from being removed from coupler 124 when coupled thereto. Aperture 170 is configured to be aligned with channel 121 of plug 120 such that wire 140 is disposed through aperture 170 into channel 121.

Referring to FIGS. 2A, 2B and 2D, the proximal end 105 of shaft 104 is disposed through the distal end 101 of connector 102 and coupled to the distal end 123 of coupler 124. In one embodiment, a bushing 146 is disposed over a proximal portion of shaft 104 and inserted into distal end 101 of connector 102 sitting between the exterior of shaft 104 and an interior of distal end 101.

Referring to FIGS. 2L and 2M, a distal portion of apparatus 100 is shown in accordance with the present disclosure, where in FIG. 2L a side view of the distal portion is shown and in FIG. 2M a side cross-sectional view of the distal portion along lines B-B (shown in FIG. 2L) is shown.

Figure 2O:
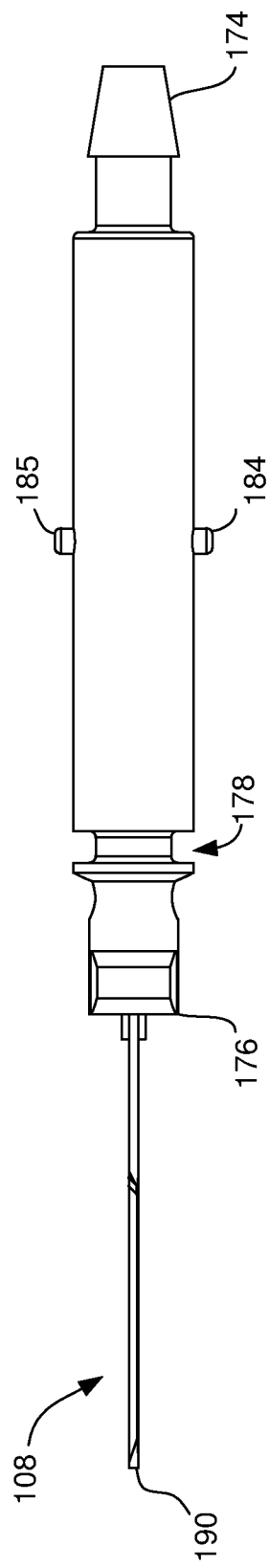
FIGS. 2O and 2P are side views of several components of the distal portion of the electrosurgical apparatus of FIG. 2A in accordance with the present disclosure.

As shown in FIGS. 2L and 2M, the distal portion of apparatus 100 includes the distal end 107 of shaft 104, electrode coupler 110, sheath 106, and ceramic tube or tip 199. Distal end 107 of shaft 104 is coupled to proximal end 174 of electrode coupler 110. Referring to FIG. 2N, electrode coupler 110 includes proximal end 174 and distal end 176. A fluid channel or lumen 182 extends from end 174 to end 176. Coupler 110 is configured in a generally cylindrical shape, where an exterior wall includes tabs or extension members 184, 185 (where tab 185 is shown in FIG. 2O) and a slot 178. The proximal end 174 of coupler 110 is configured in a conic shape as a male coupling member to be inserted through the distal end 107 of shaft 104 to couple coupler 110 thereto.

Figure 2P:
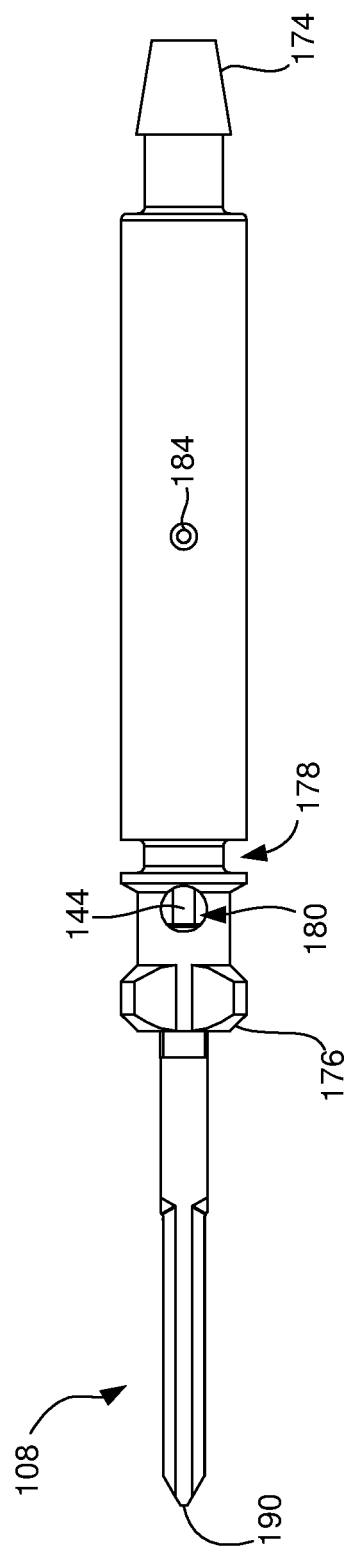

Referring to FIGS. 2M, 2O, and 2P, the distal end 144 of conductor 140 is disposed through channel 182 and coupled to proximal end 188 of electrode 108, where proximal end 188 of electrode 180 is disposed in channel 182 through end 176 of coupler 110 and mounted thereto. As shown in FIGS. 2O, 2P, in one embodiment, from a central portion to the distal end 190 of electrode 108, electrode 108 may be configured as a blade having sharp edges. In one embodiment, end 190 of blade electrode 108 is blunted. It is to be appreciated that in other embodiments electrode 108 may be configured in other geometries (e.g., other than as a blade) e.g. needle, ball, etc.

Referring to FIGS. 2L, 2M, and 2Q, distal tip 106 is configured as a sheath to disposed over distal end 176 of coupler 110 and retractable and extendable over the distal end 176 of coupler 110. Tip or sheath 106 includes open proximal end 192 and open distal end 194. End 176 of coupler 110 is disposed through end 192 and into the interior of sheath 106. In one embodiment, a ceramic tube 199 is disposed through the distal end 194 of sheath 106 and mounted thereto. Sheath 106 includes a first tab slot 198 and second tab slot (not shown), each disposed through an outer wall and on respective sides of sheath 106. Each tab slot extends along the length (e.g., from end 192 to end 194) of sheath 106. The first slot 198 and the second slot are configured to receive tabs 184, 185 of coupler 110, such that sheath 106 is extendable and retractable over coupler 110. When sheath 106 is retracted over coupler 110 toward end 174 of coupler 110, the distal portion of electrode 108 (including the sharp blade edges) extend through ceramic tube 199 and extend distally beyond end 194 of sheath 106, such that blade electrode 108 is exposed. When sheath 106 is extended or advanced over coupler 110 toward end 176 of coupler 110, electrode 108 is covered by sheath 106 and disposed in the interior 187 of sheath 106.

Coupler 110 includes at least one channel or aperture 180 through a side wall of coupler 110 proximately to distal end 176 and disposed proximally from end 188 of electrode 108 when electrode 108 is mounted to coupler 110. When inert gas is provided via channel 109 of shaft 104 into channel 182 of coupler 110, the inert gas exits via channel 180 into interior 187 of sheath 106, where the inert gas flows over electrode 108 and exits apparatus 100 through the distal end 194 of sheath 106 (and through ceramic tube 199). As shown in FIG. 2M, slot 178 of coupler 110 is configured to receive an o-ring or seal 186, which is disposed between and contacts the exterior of coupler 110 and the interior 187 of shaft 106 to prevent inert gas from escaping sheath 106 via proximal end 192. It is to be appreciated that the force exhibited or exerted by o-ring 186 on to the interior surface 187 and the exterior surface of coupler 110 contacted by o-ring 186 in addition to the sliding friction forces between these surfaces contacted by o-ring 186 prevents sheath 106 from sliding (e.g., extending and retracting) without user intention (e.g., unless intentionally extended or retracted by a user). In one embodiment, the forces range from 0.5 lbf to 1 lbf when applied along the longitudinal axis of coupler 110 and sheath 106.

When electrode 108 is covered by sheath 106, the apparatus 100 is suitable for generating plasma. In the covered position, RF energy is conducted via ESU 12, connector 102, and wire 140 and applied to electrode 108. As inert gas is supplied from ESU 12 and provided via shaft 104 and coupler 110 to sheath 106, electrode 108 is held at high voltage and high frequency to generate a cold plasma beam that is ejected from the distal end of tip 106.

When electrode 108 is exposed by retracting sheath 106, apparatus 100 may be used for two cutting modes: mechanical cutting and electrosurgical cutting. In mechanical cutting mode, RF or electrosurgical energy is not applied to electrode 108, and therefore, the electrode 108 is in a de-energized state. In this mode, the electrode 108 can be used to excise tissue via mechanical cutting, e.g., the blade electrode makes contact with tissue to physically cut the tissue. In electrosurgical cutting mode, the electrode 108 is exposed and used both while being electrically energized and enveloped with inert gas flow.

Referring to FIG. 2A, connector 102 of apparatus 100 may be coupled to an ESU, such as, ESU 12 to receive electrosurgical energy and/or gas therefrom. Apparatus 100 may include a foot switch interface 850 for controlling the different modes of operation of apparatus 100, including the characteristics of a plasma beam emitted from tip 106. The foot switch interface 850 includes one or more foot switches 852, 854, and is coupled to ESU 12. In response to pressing the one or more foot switches 852, 854, communication signals are sent via foot switch interface 850 to ESU 12 to control the electrosurgical energy provided via ESU 12 to apparatus 100. In this way, foot switch interface 850 is configured to control the mode of operation (e.g., cold plasma, coagulation, ablation, etc.) that apparatus 100 is in during a procedure. It is to be appreciated that although two foot switches 852, 854 are shown, in some embodiments, foot switch interface 850 includes at least one separate foot switch for each mode of operation of apparatus 100. In other embodiments, additional foot switches may be included in foot switch interface 850 for controlling the power provided by ESU 12 to apparatus 100 and/or the gas provided by a gas supply (e.g., including in ESU 12) to apparatus 100.

It is to be appreciated that in other embodiments ESU 12 may include controls for controlling the electrosurgical energy and/or gas provided to apparatus 100 and interface 850 may be removed. For example, ESU 12 may include an input/output interface disposed on a housing of the ESU 12 for inputting information into the ESU and displaying information to a user. The input/output interface may include, for example, buttons, pushbuttons, dials, etc. for entering parameters into the ESU 12. In one embodiment, the ESU 12 may include a touchscreen which enables both entering and displaying of information.

Shaft 104 is configured from a flexible, insulative material, such that tip 106 may be moved to achieve a wide range of positions. Exemplary materials for the flexible, insulating outer shaft 206 include, but are not limited to, PVC, Santoprene, silicone materials, etc.

Figure 3:
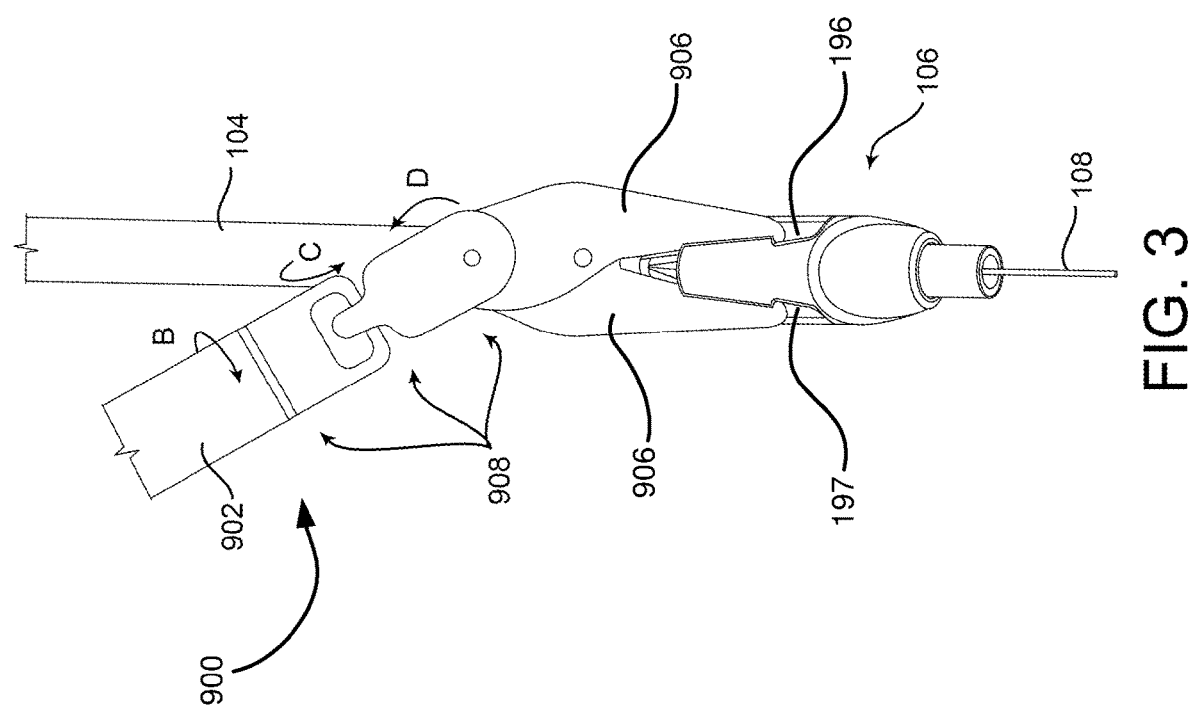
FIG. 3 illustrates forceps coupled to a distal end of the electrosurgical apparatus of FIG. 2A in accordance with the present disclosure.

Referring to FIG. 2L, tip 106 includes grasping slots 196, 197, which are configured to be grasped using a grasping tool (e.g., forceps) to control the orientation of tip 106. For example, as shown in FIG. 3, apparatus 100 is shown coupled to forceps 900 in accordance with the present disclosure. As shown in FIG. 3, forceps 900 includes a shaft 902 and jaws or engaging members 906. Grasping slots 196 and 197 are configured to receive engaging members of a grasping tool such as jaws 906 of forceps 900. In this way, grasping slots 196 and 197 enable tip 106 to be grasped by a grasping tool. Referring to FIG. 3, jaws 906 of forceps 900 are shown grasping slots 196 and 197 in accordance with the present disclosure. Once jaws 906 of grasping tool or forceps 900 securely grip slots 196 and 197 of tip 106, the forceps 900 may then be used to manipulate the position of tip 106 as the user desires.

In one embodiment, a second forceps (e.g., configured in in the same manner as forceps 900) may be used to grip distal end 107 of shaft 104 while the jaws 906 of first forceps 900 is used to grip sheath 106 via slots 196, 197. In this arrangement, the first forceps 900 may slide (e.g., extend or retract) sheath 106 over coupler 110 to expose or cover electrode 108 and manipulate the sheath 106 to direct a generated plasma beam in a desired direction.

It is to be appreciated that shaft 902 of forceps 900 may be configured as a rigid linear shaft or alternatively as multiple linked sections configured to be manipulated into different positions. In one embodiment, the shaft 902 may include one or more pivoting or rotational members 908 configured to allow jaws 906 to rotate tip 106 of apparatus 100 in a plurality of direction (e.g., rotational directions B, C, and D shown in FIG. 3) and, where second forceps are provided, to extend or retract sheath 106 over coupler 110. In one embodiment, one or more forceps 900 is/are controlled via a control interface, where the control interface may be a manual control interface (e.g., including one or more controls for a human to manually control forceps 900) or a computer or robotic control interface (e.g., forceps 900 is computer operated) to operate apparatus 100 during electrosurgical procedures.

In an exemplary embodiment, the grasping tool used to manipulate the orientation of tip 106 may be a robotic arm, such as, but not limited to, ProGrasp™ Forceps of the da Vinci® Surgical System made by Intuitive Surgical®, however other robotic arm systems may also be used with apparatus 100 to control tip 106.

It is to be appreciated that, in one embodiment, apparatus 100 and/or forceps 900 may be used with a trocar. In this embodiment, a first trocar or cannula and a second trocar or cannula may each be disposed through a portion of a patient's body (e.g., through the abdomen of a patient) to provide access to a desired tissue site within the patient's body. The distal tip 106 and at least a portion of shaft 104 are disposed through the first trocar and a portion of the grasping tool or forceps 900 (including jaws 906) is disposed through the second trocar, such that both the distal tip 106 of apparatus 100 and the jaws 906 of forceps 900 have access to the tissue site. It is to be appreciated that where second forceps are needed (e.g., to extend and retract sheath 106 over coupler 110), a portion of the second forceps is disposed through the second trocar. Within the patient's body, slots 196, 197 of distal tip 106 receive jaws 906 and forceps 900 are used to control the distal tip 106 and perform a surgical procedure (e.g., mechanical cutting, electrosurgical cutting, ablation, coagulation, fulguration, application of a cold plasma beam, etc.) at the tissue site. In another embodiment, the distal tip 106 and at least a portion of shaft 104 may be disposed in the same trocar or cannula as the grasping tool or forceps 900 (and second forceps if required). In another embodiment, apparatus 100 may be used in open surgery.

Referring to FIGS. 4A-6G, another embodiment of an electrosurgical apparatus 200 is provided. Unless otherwise indicated, components of electrosurgical apparatus 200 that are similarly numbered to corresponding components of electrosurgical apparatus 100 shown in FIGS. 2A-3 are configured in the manner and with the features described above and may not be described again below in the interest of brevity.

Figure 4A:
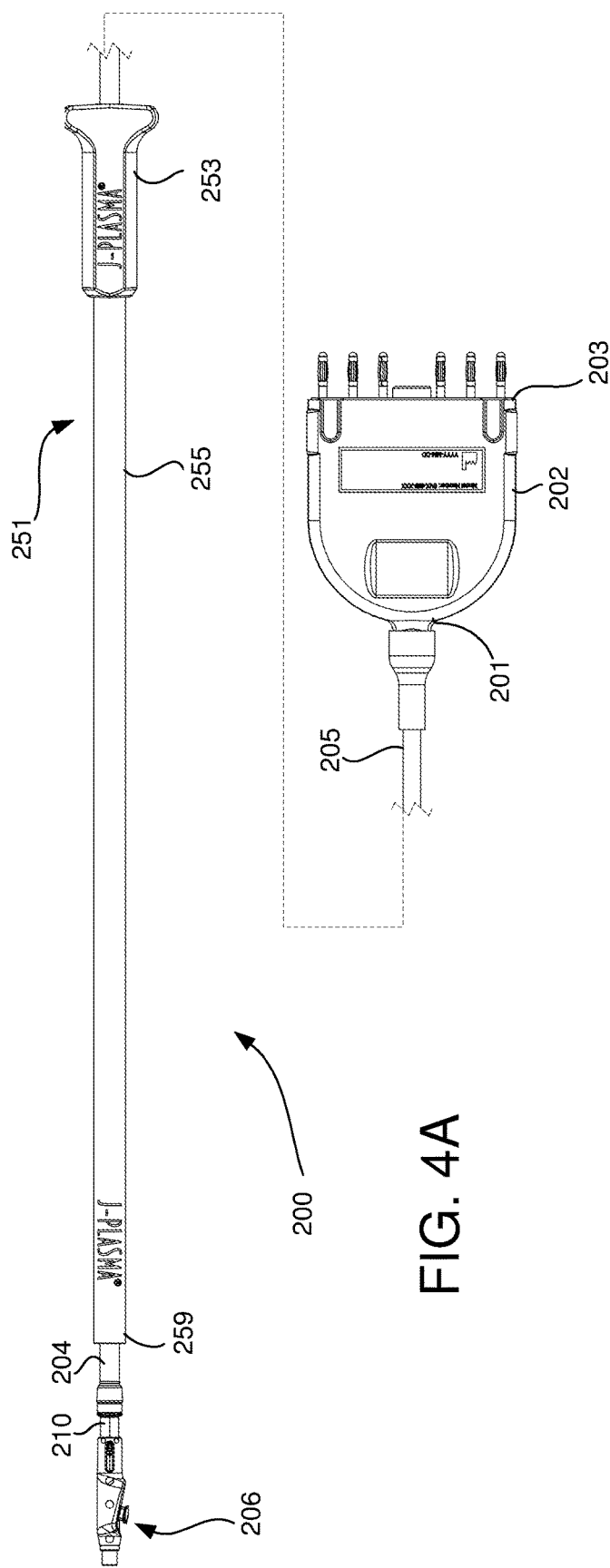
FIG. 4A is a side view of an electrosurgical apparatus in accordance with another embodiment of the present disclosure.
Figure 4B:
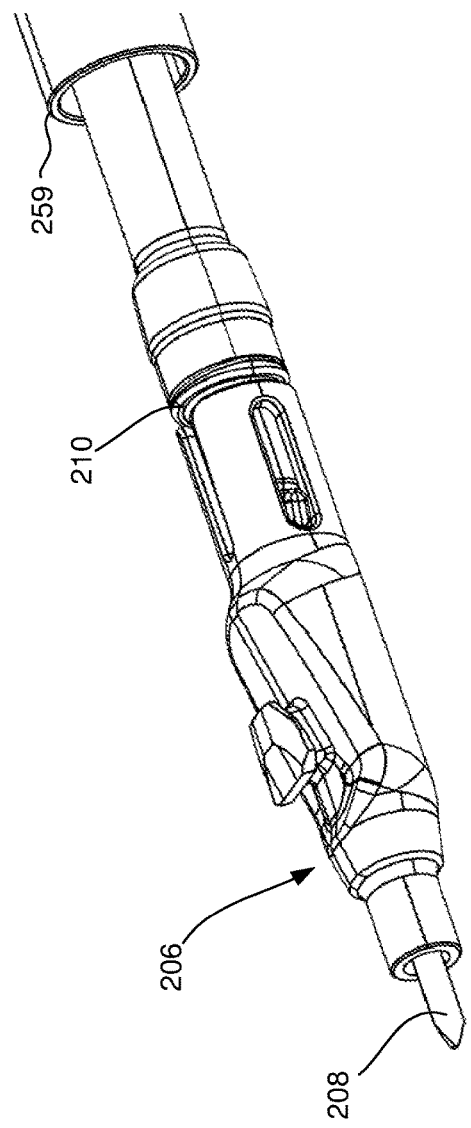
FIG. 4B is a perspective view of a distal portion of the electrosurgical apparatus of FIG. 4A in accordance with the present disclosure.

Referring to FIGS. 4A and 4B, an electrosurgical apparatus 200 is provided including a connector or plug 202, flexible insulating outer shaft or flow tube 204, electrode coupler 210, distal tip 206, and electrode 208. Apparatus 200 further includes an introducer 251 including a handle portion 253 and rigid tube portion 255. The introducer 251 is disposed on flexible tube 204 and is slidable along tube 204 between connector 202 and distal end 206. The rigid tube portion 255 will maintain a portion of the flexible tube 204 that the tube portion 255 is disposed upon in a linear position. For example, in use, the introducer 251 may be slid toward the distal tip 206 to ensure the distal tip 206 is linear along the longitudinal axis of tube 204 while the distal tip 206 is being introduced into a trocar or cannula. The introducer 251 stabilizes the tip 206 so the tip 206 may be grasped by a grasping tool, e.g., forceps 900. When the distal tip 206 is in a proper position approximate the desired surgical site or grasped by an appropriate grasping tool 900, the introducer 251 may be slid toward a proximal end 205 of tube 204 by grasping the handle 253 and sliding the introducer 251 toward the connector 202. Once the distal end 259 of the rigid tube 255 is a predetermined distance from the distal tip 206 and the introducer 251 is not covering at least a portion of the distal end 207 of the flexible shaft 204, the distal tip 206 may be manipulated as described above. Additionally, the introducer 251 may be slid toward the proximal end 205 of the tube until the introducer is outside the surgical port, e.g., a trocar, a cannula, etc., and retained outside the surgical port until the introducer 251 is reintroduced into the surgical port as necessary, e.g., to provide mechanical support to the distal tip 206 when being grasped by a grasping tool.

Figure 5A:
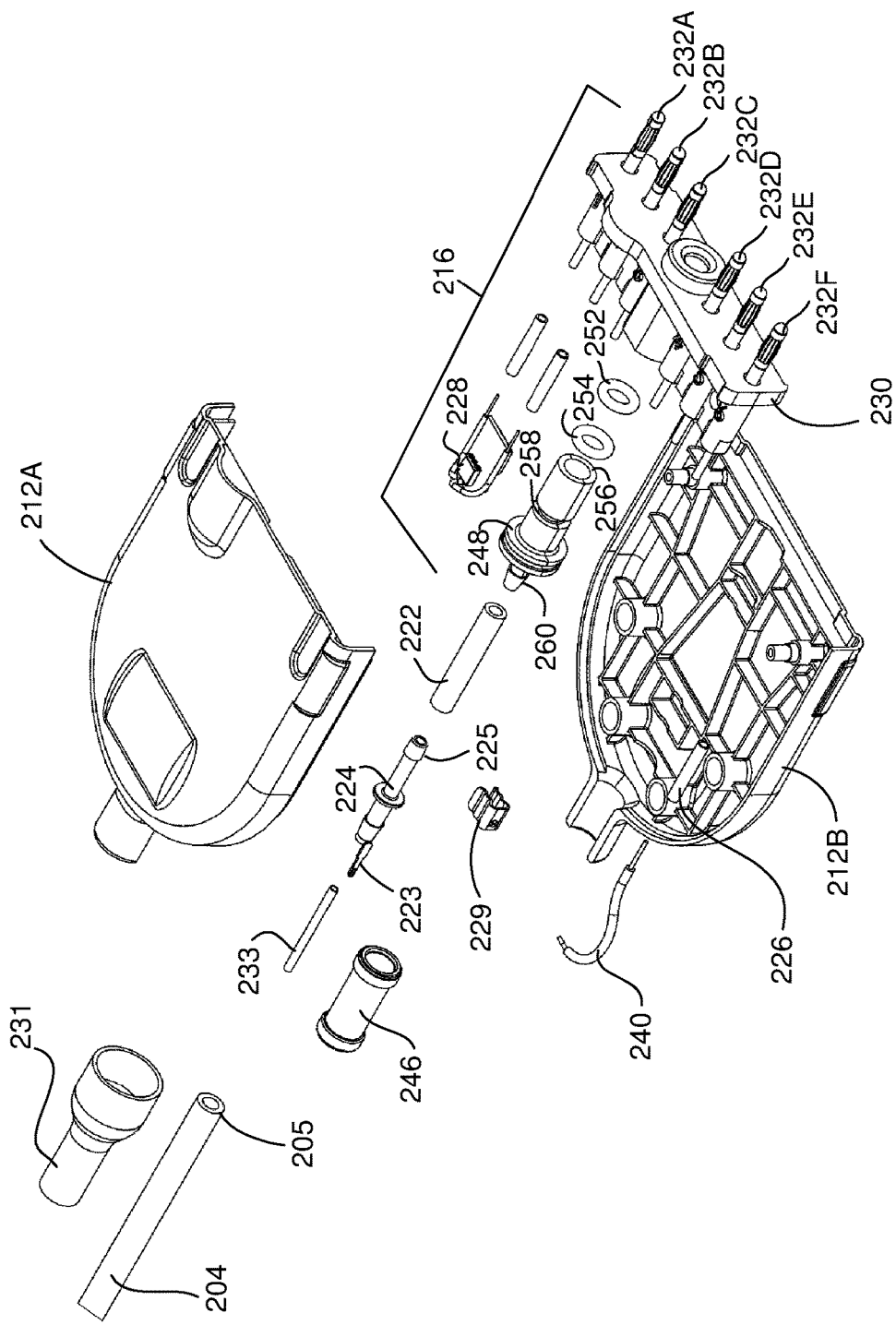
FIG. 5A is an exploded perspective view of a proximal portion of the electrosurgical apparatus of FIG. 4A in accordance with the present disclosure.
Figure 5B:
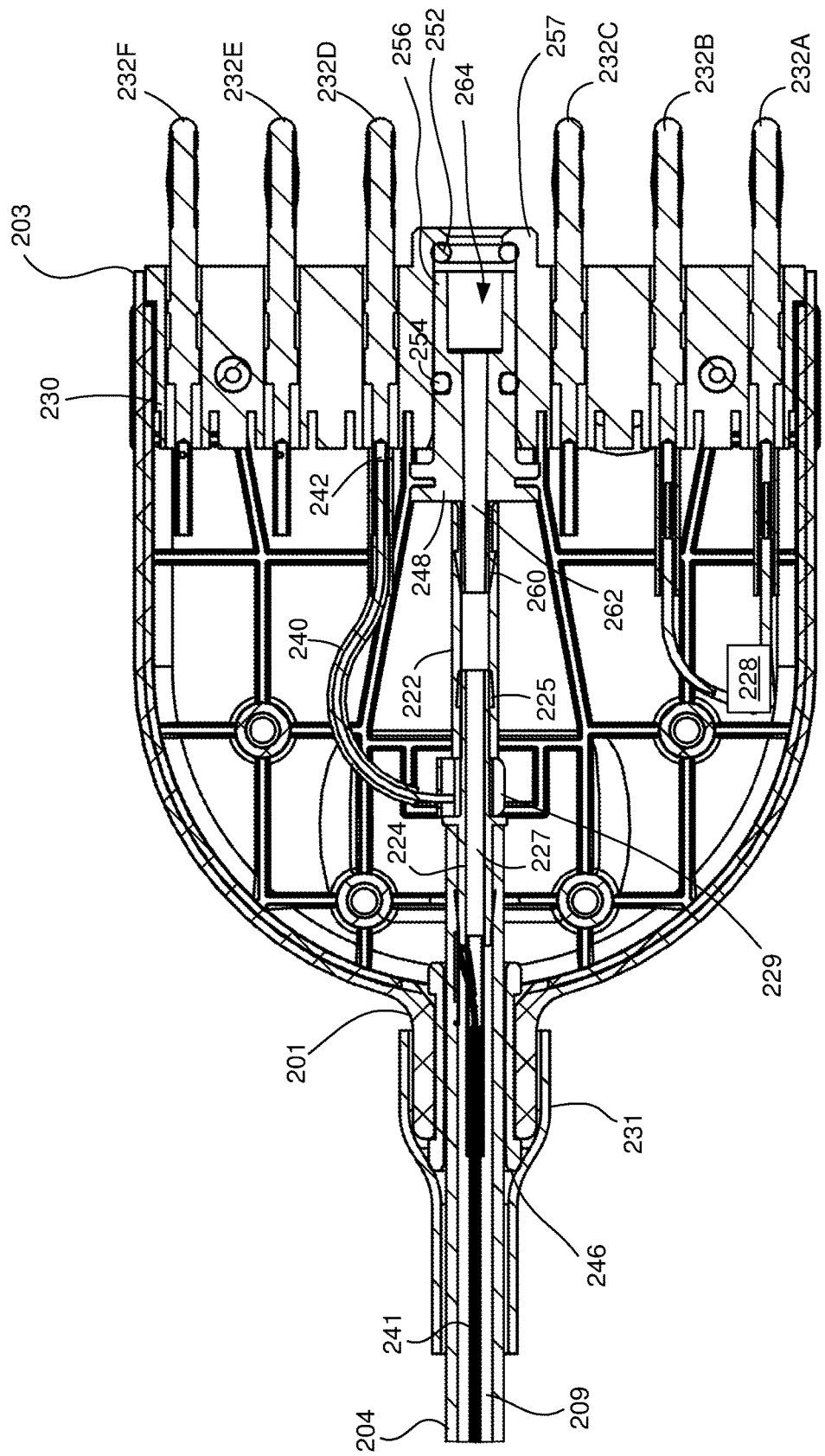
FIG. 5B is a side cross-sectional view of the proximal portion of the electrosurgical apparatus of FIG. 4A in accordance with the present disclosure.

Referring to FIGS. 5A-5B, a proximal portion of apparatus 200 is shown in accordance with an embodiment of the present disclosure, where, in FIG. 5A, an exploded perspective view of the proximal portion is shown and, in FIG. 5B, a side cross-section view is shown. The proximal portion of apparatus 200 includes connector 202, which includes distal end 201 and proximal end 203 (best seen in FIGS. 4A, 5B).

Connector 202 is configured to couple apparatus 200 to an electrosurgical generator, such as ESU 12, for receiving electrosurgical energy and fluid (e.g., an inert gas, such as helium or argon) for use in procedures performed using apparatus 200, as described above. Connector 202 includes shells 212A, 212B, which, when coupled together, form a housing for connector 202. Between shells 212A, 112B, connector 202 includes an interior, where a sub-assembly 216 of connector 202 is disposed in the interior. Sub-assembly 216 includes conductors 232A-F, base 230, processor and/or memory 228, tube coupler 248, fluid tube 222, tube coupler 224 and sleeve 226.

Coupler 248 includes a proximal end 256 and a distal end 260. A fluid channel or lumen 262 extends from end 260 toward end 256 within the interior of coupler 248. Distal end 260 is configured as a conic portion or male coupling member. As best seen in FIG. 5B, end 256 of coupler 248 includes an opening or channel 264, which is in fluid communication with channel 262 and is configured to receive an inert gas from the electrosurgical generator (or another gas source) when connector 202 is coupled thereto. Distal end 260 is configured to be inserted into a proximal end of tube 222, such that inert gas is provided from opening 264 and channel 262 into the interior lumen or channel of tube 222. Referring to FIG. 5B, the proximal end 256 of coupler 248 is disposed through a channel or mounting portion 257 of base 230 and mounted to base 230. Coupler 248 includes a circular slot 258 disposed around the exterior of coupler 248 and configured to receive a first o-ring 254. As shown in FIG. 5B, when coupler 248 is mounted to base 230, the first o-ring 254 is disposed in slot 258 and between coupler 248 and an interior wall of base 230. A second o-ring 252 is disposed against proximal end 256 of coupler 248. O-rings 252, 254 are configured to seal coupler 248 and prevent gas leakage when inert gas is provided to coupler 248.

As best seen in FIG. 5B, tube 222 is further coupled to a proximal end 225 of tube coupler 224. Coupler 224 includes proximal end 225 and distal end 223, where end 225 is configured in a conic shape as a male coupling member for coupling to fluid tubes. End 225 is configured to be inserted into and coupled to the distal end of tube 222 and end 223 is configured to be inserted into and coupled to the proximal end 205 of fluid tube or shaft 204 (as shown in FIG. 5B). A fluid channel or lumen 227 extends from end 223 to end 225 and carries inert gas provided via tube 222 to fluid channel or lumen 209 (shown in FIG. 5B) of shaft 204. Coupler 224 is made of a conductive material, for example, stainless steel.

Wire 240 includes a proximal end 242, which is coupled to conductor 232D of connector 202 for receiving electrosurgical energy to be provided to electrode 208. An insulating cover or sheath 226, e.g., heat shrink, is disposed over an end of conductor 232D and the proximal end 242 of wire 240. Once assembled with heat, this sheath 226 provides electrical isolation at that assembly. Conductive clip 229 slides over a portion of coupler 224 and makes an electrical connection. The wire 240 is coupled to clip 229 at a distal end (e.g., via soldering) and pin 232D at proximal end 242. This completes the electrical connection from pin 232D to coupler 224 via the wire 240 and conductive clip 229. In one embodiment, the clip 229 is coupled to the coupler 224 by an interference fit, whereby the clip 229 is securely mated to the coupler 224 ensuring a proper electrical connection. The distal end 223 of coupler 224 is coupled to wire 241 that is disposed in the outer tube 204. Sheath 233 is disposed over the coupling between the distal end 223 of coupler 224 and proximal end of wire 241.

It is to be appreciated that wire 241 is a flexible electrically conducting member that when disposed in shaft 204, wire 241 will move and be contorted along with the flexible outer tube or shaft 204. The flexible electrically conducting member 241 may take other forms and still be within the scope of the present disclosure. For example, the flexible electrically conducting member 241 may include, but not limited to, a flexible electrically conducting rod, a flexible electrically conducting tube, a flexible electrically conducting spring, etc.

The proximal end 205 of shaft 204 is disposed through the distal end 201 of connector 202 and coupled to the distal end 223 of coupler 224. In one embodiment, a bushing 246 is disposed over a proximal portion of shaft 204 and inserted into distal end 201 of connector 202 sitting between the exterior of shaft 204 and an interior of distal end 201. In another embodiment, a shrink wrap 231 may be disposed over the bushing 246 and distal end 201 of connector 202. Shrink wrap 231 may function, among other functions, to provide strain relief for the shaft 204 at the distal end 201 of the connector 202 and hide the assembly of the connector halves at distal end 201 and the bushing 246 for a better cosmetic look.

Referring to FIGS. 6A-6G, a distal portion of apparatus 200 is shown in accordance with the present disclosure.

Figure 6C:
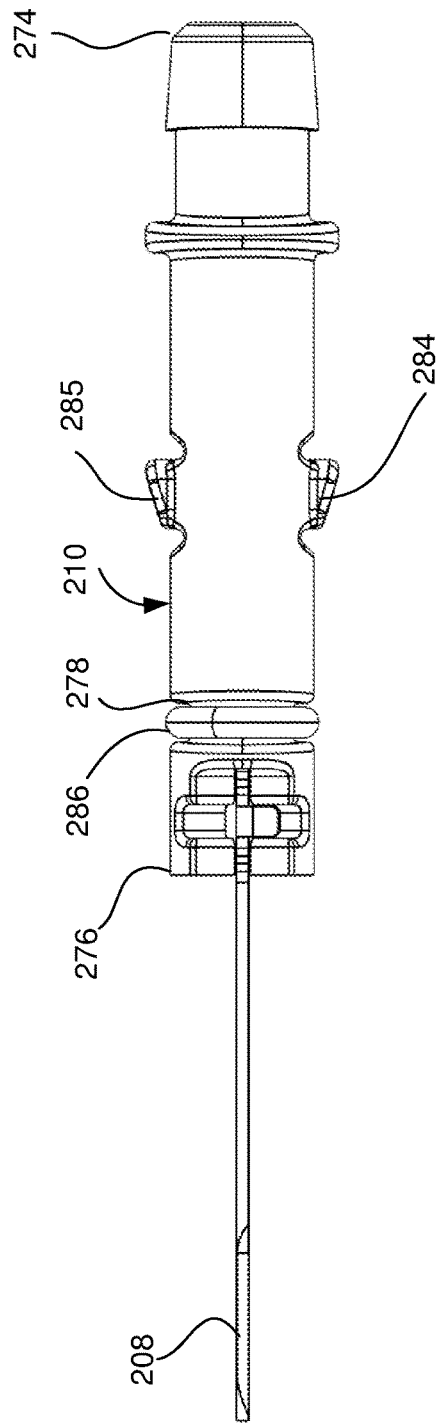
FIGS. 6C and 6D are side views of several components of the distal portion of the electrosurgical apparatus of FIG. 4A in accordance with the present disclosure.

As shown in FIGS. 6A and 6B, the distal portion of apparatus 200 includes the distal end 207 of shaft 204, electrode coupler 210, sheath 206, and ceramic tube or tip 299. Distal end 207 of shaft 204 is coupled to proximal end 274 of electrode coupler 210. Referring to FIG. 6C, electrode coupler 210 includes proximal end 274 and distal end 276. A fluid channel or lumen extends from ends 274 to ends 276. Coupler 210 is configured in a generally cylindrical shape, where an exterior wall includes tabs or extension members 284, 285 and a slot 278. The proximal end 274 of coupler 210 is configured in a conic shape as a male coupling member to be inserted through the distal end 207 of shaft 204 to couple coupler 210 thereto.

Figure 6D:
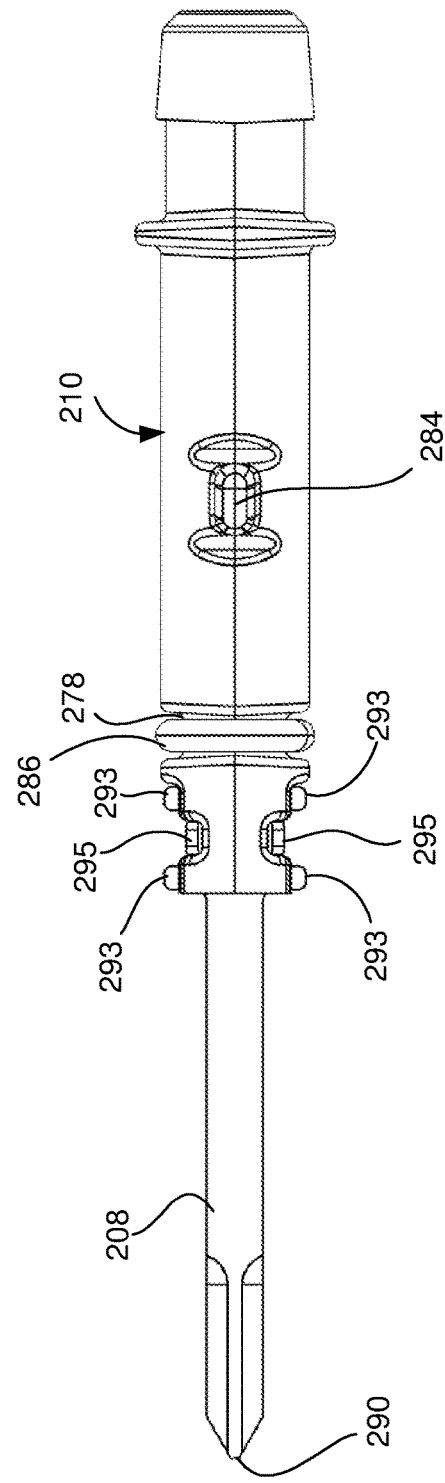
Figure 6E:
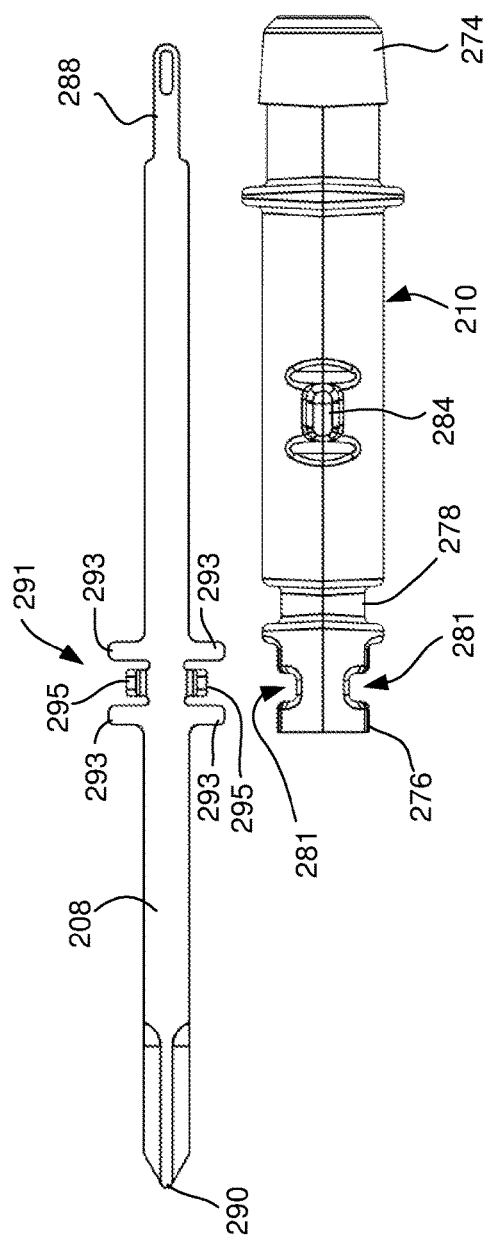
FIG. 6E is a side view of an electrode and electrode coupler of the electrosurgical apparatus of FIG. 4A in accordance with the present disclosure.

Referring to FIGS. 6B, 6C, 6D and 6E, the distal end 244 of conductor 241 is disposed through channel 282 and coupled to proximal end 288 of electrode 208, where proximal end 288 of electrode 280 is disposed in channel 282 through end 276 of coupler 210 and mounted thereto. As shown in FIGS. 6D and 6E, in one embodiment, from a central portion to the distal end 290 of electrode 208, electrode 208 may be configured as a blade having sharp edges. In one embodiment, end 290 of blade electrode 208 is blunted. It is to be appreciated that in other embodiments electrode 208 may be configured in other geometries (e.g., other than as a blade) e.g. needle, ball, etc.

Figure 6F:
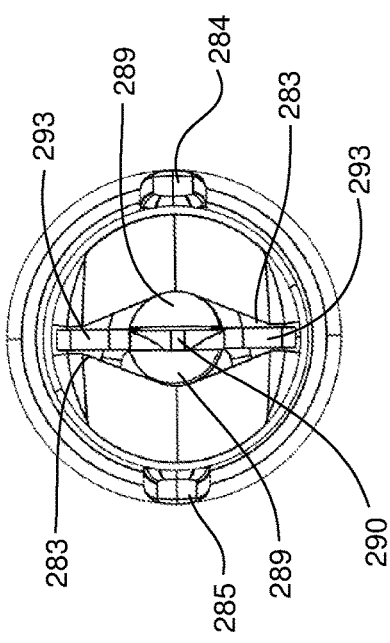
FIG. 6F is a view looking into the distal end of the electrosurgical apparatus of FIG. 4A in accordance with the present disclosure.
Figure 6G:
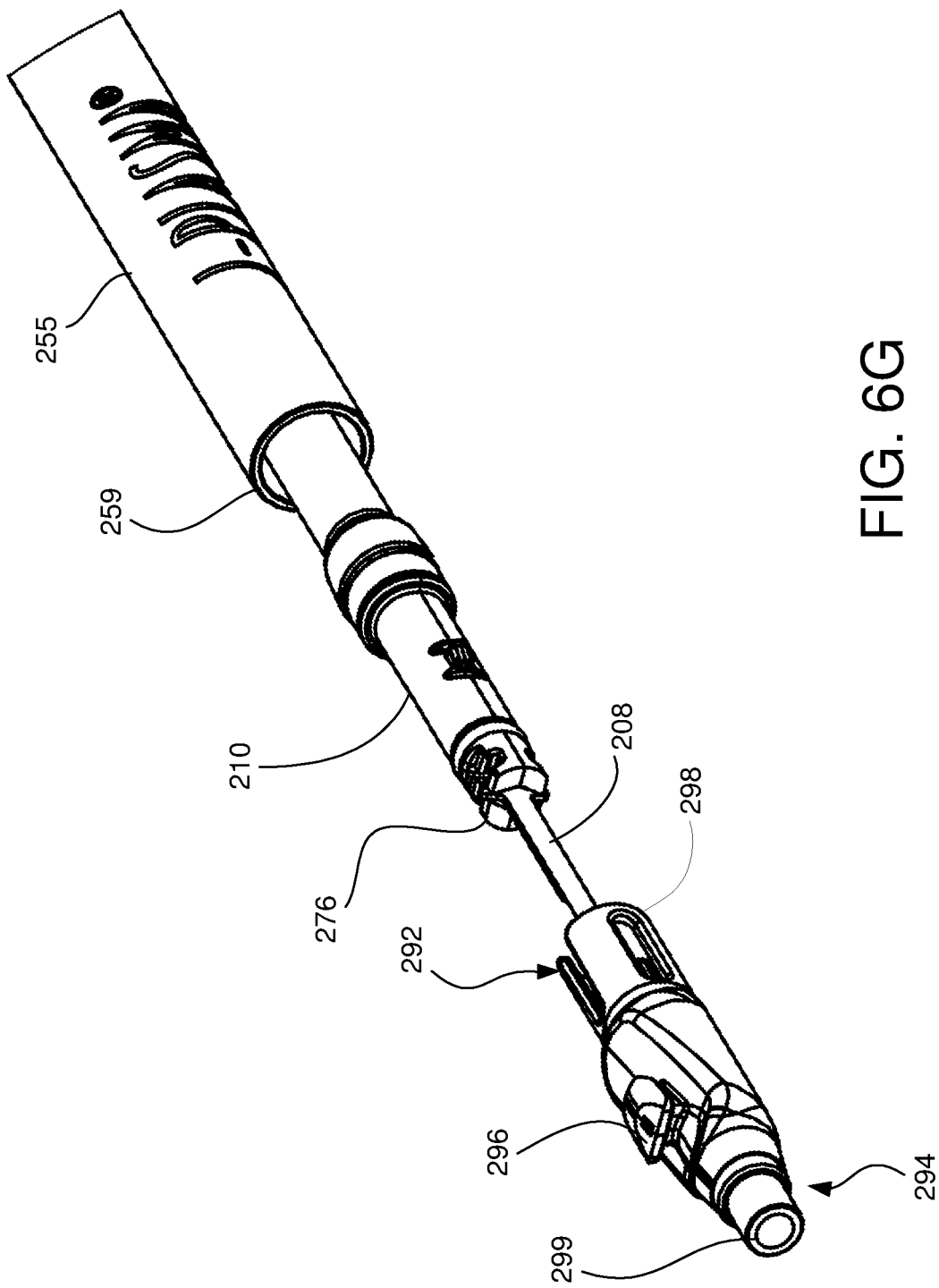
FIG. 6G is an exploded perspective view of the distal portion of the electrosurgical apparatus of FIG. 4A in accordance with the present disclosure.

Referring to FIGS. 6A, 6B, and 6G, distal tip 206 is configured as a sheath to disposed and retractable and extendable over distal end 276 of coupler 210. Tip or sheath 206 includes open proximal end 292 and open distal end 294. End 276 of coupler 210 is disposed through end 292 and into the interior of sheath 206. In one embodiment, a ceramic tube 299 is disposed through the distal end 294 of sheath 206 and mounted thereto. Sheath 206 includes a first tab slot 298 and second tab slot (not shown), each disposed through an outer wall and on respective sides of sheath 206. Each tab slot extends along a portion of the length of sheath 206 (e.g., a portion along the length from end 292 to end 294). The first slot 298 and the second slot are configured to receive tabs 284, 285 of coupler 210, such that sheath 206 is extendable and retractable over coupler 210. When sheath 206 is retracted over coupler 210 toward end 274 of coupler 210, the distal portion of electrode 208 (including the sharp blade edges) extend through ceramic tube 299 and extend distally beyond end 294 of sheath 206, such that blade electrode 208 is exposed. When sheath 206 is extended or advanced over coupler 110 toward end 276 of coupler 210, electrode 208 is covered by sheath 106 and disposed in the interior 287 of sheath 206.

Referring to FIG. 6E, the electrode 208 and electrode coupler 210 are illustrated. Electrode 208 is generally planar and includes a plurality of tabs 291 disposed in a central portion of the electrode 208 between the proximal end 288 and distal end 290. Outer tabs 293 are substantially rigid while inner tabs 295 are bendable or adjustable. Proximal end 288 of electrode 208 is inserted into distal end 276 of coupler 210 until tabs 295 align with recesses 281 formed in the distal end 276 of coupler 210. Tabs 295 are then bent into the recesses 281 to secure the electrode 208 in the coupler 210. Referring to FIG. 6F, the distal end 276 of coupler 210 further includes two slots 283 diametrically opposed on the interior of coupler 210. Slots 283 are configured to receive at least one of tabs 293 of electrode 208. In this manner, electrode 208 is secured longitudinally via tabs 295 in recesses 281 (i.e., the electrode 208 does not move lengthwise with respect to electrode coupler 210) and laterally via tabs 293 in slots 283 (i.e., the electrode 208 does not move side-to-side).

When inert gas is provided via channel 209 of shaft 204 into channel 282 of coupler 210, the inert gas exits via passage ways 289 into interior 287 of sheath 206, where the inert gas flows over electrode 208 end exists apparatus 200 through the distal end 294 of sheath 206 (and through ceramic tube 299). As shown in FIGS. 6C and 6E, slot 278 of coupler 210 is configured to receive an o-ring or seal 286, which is disposed between and contacts the exterior of coupler 210 and the interior 287 of shaft 206 to prevent inert gas from escaping sheath 206 via proximal end 292. It is to be appreciated that the force exhibited or exerted by o-ring 286 on to the interior surface 287 and the exterior surface of coupler 210 contacted by o-ring 286 in addition to the sliding friction forces between these surfaces contacted by o-ring 286 prevents sheath 206 from sliding (e.g., extending and retracting) without user intention (e.g., unless intentionally extended or retracted by a user). In one embodiment, the forces range from about 0.3 lbf to about 0.8 lbf when applied along the longitudinal axis of coupler 110 and sheath 106.

When electrode 208 is covered by sheath 206, the apparatus 200 is suitable for generating plasma. In the covered position, RF energy is conducted via ESU 12, connector 202, and wires 240, 241 and applied to electrode 208. As inert gas is supplied from ESU 12 and provided via shaft 204 and coupler 210 to sheath 206, electrode 208 is held at high voltage and high frequency to generate a cold plasma beam that is ejected from the distal end of tip 206.

When electrode 208 is exposed by retracting sheath 206, apparatus 200 may be used for two cutting modes: mechanical cutting and electrosurgical cutting. In mechanical cutting mode, RF or electrosurgical energy is not applied to electrode 208, and therefore, the electrode 208 is in a de-energized state. In this mode, the electrode 208 can be used to excise tissue via mechanical cutting, e.g., the blade electrode makes contact with tissue to physically cut the tissue. In electrosurgical cutting mode, the electrode 208 is exposed and used both while being electrically energized and enveloped with inert gas flow.

Referring to FIG. 4A, connector 202 of apparatus 200 may be coupled to an ESU, such as, ESU 12 to receive electrosurgical energy and/or gas therefrom. Apparatus 200 may include a foot switch interface 850, as shown and described in relation to FIG. 2A. It is to be appreciated that in other embodiments ESU 12 may include controls for controlling the electrosurgical energy and/or gas provided to apparatus 200 and interface 850 may be removed. For example, ESU 12 may include an input/output interface disposed on a housing of the ESU 12 for inputting information into the ESU and displaying information to a user. The input/output interface may include, for example, buttons, pushbuttons, dials, etc. for entering parameters into the ESU 12. In one embodiment, the ESU 12 may include a touchscreen which enables both entering and displaying of information.

Shaft 204 is configured from a flexible, insulative material, such that tip 206 may be moved to achieve a wide range of positions. Exemplary materials for the flexible, insulating outer shaft 206 include, but is not limited to, PVC, Santoprene, silicone materials, etc.

Referring to FIG. 6A, tip 206 includes grasping member 296, which is configured to be grasped using a grasping tool (e.g., forceps) to control the orientation of tip 206. Grasping member 296 extends away from the outer surface of the distal tip 206 and is configured to receive engaging members of a grasping tool such as jaws 906 of forceps 900, as described above in relation to FIG. 3. In this way, grasping member 296 enables tip 206 to be grasped by a grasping tool. Once jaws 906 of grasping tool or forceps 900 securely grip member 296 of tip 206, the forceps 900 may then be used to manipulate the position of tip 206 as the user desires.

As described above, a second forceps (e.g., configured in in the same manner as forceps 900) may be used to grip distal end 207 of shaft 204 while the jaws 906 of first forceps 900 is used to grip sheath 206 via member 296. In this arrangement, the first forceps 900 may slide (e.g., extend or retract) sheath 206 over coupler 210 to expose or cover electrode 208. Alternatively, the introducer 251 may be advanced toward the distal end 207 of shaft 204 to keep shaft 204 substantially linear while the jaws 906 of first forceps 900 is used to grip sheath 206 via member 296 to extend or retract the sheath 206 and/or manipulate the sheath 206 to direct a generated plasma beam.

It is to be appreciated that apparatus 200 and/or forceps 900 may be used with at least one trocar or cannula as described above in relation to apparatus 100.

It is to be appreciated that the various features shown and described are interchangeable, that is a feature shown in one embodiment may be incorporated into another embodiment.

While the disclosure has been shown and described with reference to certain preferred embodiments thereof, it will be understood by those skilled in the art that various changes in form and detail may be made therein without departing from the spirit and scope of the disclosure as defined by the appended claims.

Furthermore, although the foregoing text sets forth a detailed description of numerous embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. An electrosurgical apparatus comprising:
a connector including a proximal end and a distal end, the proximal end of the connector configured to receive electrosurgical energy and a gas supply;
a flexible insulating outer tube including a proximal end and a distal end, the proximal end of the flexible insulating outer tube directly connected to the distal end of the connector;
a distal tip including a proximal end and a distal end, the proximal end of the distal tip directly connected to the distal end of the flexible insulating outer tube, the distal tip including an electrode, the distal tip includes a sheath that is retractable and extendable over the electrode to expose the electrode when the sheath is in a first position and conceal or cover the electrode when the sheath is in a second position; and
a flexible electrically conducting member disposed through the flexible insulating outer tube and including a proximal end and a distal end, the proximal end of the flexible electrically conducting member coupled to the connector, the distal end of the flexible electrically conducting member extending into the distal tip and coupled to the electrode and configured to provide electrosurgical energy thereto;
wherein the flexible insulating outer tube and the flexible electrically conducting member are configured to enable the distal tip to achieve a plurality of positions relative to the flexible insulating outer tube.

2. The electrosurgical apparatus of claim 1, further comprising at least one memory disposed in the connector, the at least one memory stores information related to use of the electrosurgical apparatus.

3. The electrosurgical apparatus of claim 1, further comprising a coupler disposed in the connector and including a proximal end and distal end, the proximal end configured to receive the gas supply and distal end configured to be coupled to the proximal end of the flexible insulating outer tube, a fluid channel extends from the proximal end to the distal end of the coupler, the coupler further includes an extension member that extends perpendicularly away from the fluid channel and is configured to receive the flexible conducting member and provide the flexible conducting member to the flexible insulating outer tube.

4. The electrosurgical apparatus of claim 3, further comprising a plug configured to be disposed in the extension member of the coupler, the plug including a channel to receive the flexible conducting member such that when the flexible conductor member is disposed through the channel of the plug the received gas is prevented from leaking into the connector.

5. The electrosurgical apparatus of claim 4, further comprising a cap configured to be disposed over the extension member to prevent the plug from being removed, the cap including at least one slot to securely mate to the coupler.

6. The electrosurgical apparatus of claim 1, wherein the distal tip further comprises an electrode coupler including a proximal end and a distal end, the proximal end of the electrode coupler coupled to the distal end of the flexible insulating outer tube, the distal end of the electrode coupler configured to support the electrode, the sheath being slidingly disposed over the distal end of the electrode coupler.

7. The electrosurgical apparatus of claim 6, wherein the electrode coupler further includes at least one tab disposed on an outer wall and the sheath includes at least one tab slot for receiving the at least one tab such that sheath is extendable and retractable over the electrode coupler a length of the slot.

8. The electrosurgical apparatus of claim 6, wherein the electrode coupler includes at least one aperture through a side wall proximately to distal end of the electrode coupler, where when gas is provided via the flexible insulating outer tube to the electrode coupler, the gas exits via the at least one aperture into an interior of sheath, flows over the electrode and exits through the distal end of the sheath.

9. The electrosurgical apparatus of claim 1, wherein the distal tip is configured to be grasped by a grasping tool to manipulate the position of the distal tip relative to the flexible insulating outer tube.

10. The electrosurgical apparatus of claim 9, wherein the distal tip includes a first grasping slot and a second grasping slot, the first and second grasping slots configured to enable the grasping tool to grasp the distal tip.

11. The electrosurgical apparatus of claim 9, wherein the distal tip includes a grasping member that extends away from an outer surface of the distal tip, the grasping member configured to enable the grasping tool to grasp the distal tip.

12. The electrosurgical apparatus of claim 1, wherein the electrode is configured as an electrically conducting needle.

13. The electrosurgical apparatus of claim 1, wherein the electrode is configured as an electrically conducting blade.

14. The electrosurgical apparatus of claim 1, wherein in a first position of the sheath, the electrode extends beyond the distal end of the distal tip for cutting, and, in a second position of the sheath, the electrode is retracted within the distal tip and is energized via the flexible electrically conducting member to form plasma when an inert gas is provided to the distal tip.

15. The electrosurgical apparatus of claim 1, further comprising an introducer including a rigid tube portion disposed on the flexible insulating outer tube and slidable along the flexible insulating outer tube between the connector and the distal end of the flexible insulating outer tube, wherein the rigid tube portion maintains a portion of the flexible insulating outer tube that the rigid tube portion is disposed upon in a linear position.

16. The electrosurgical apparatus of claim 1, further comprising a conductive tube coupler disposed in the connector and including a proximal end and distal end, the proximal end of the conductive tube coupler configured to receive the gas supply and the distal end of the conductive tube coupler configured to be coupled to the proximal end of the flexible insulating outer tube, a fluid channel extends from the proximal end of the conductive tube coupler to the distal end of the conductive tube coupler and provides inert gas to flexible insulating outer tube, the distal end of the conductive tube coupler coupled to the flexible conductive member disposed in the flexible insulating outer tube.

17. The electrosurgical apparatus of claim 1, further comprising a cylindrical ceramic tube coupled to the distal end of the sheath, wherein when the sheath is in the first position, the distal end of the electrode extends passed the ceramic tube and, when the sheath is in the second position, the distal end of the electrode is covered by the ceramic tube.

18. An electrosurgical apparatus comprising:
a connector including a proximal end and a distal end, the proximal end of the connector configured to receive electrosurgical energy and a gas supply;
a flexible insulating outer tube including a proximal end and a distal end, the proximal end of the flexible insulating outer tube couple to the distal end of the connector;
a distal tip including a proximal end and a distal end, the proximal end of the distal tip coupled to the distal end of the flexible insulating outer tube, the distal tip including an electrode, the distal tip including a sheath that is retractable and extendable over the electrode to expose the electrode when the sheath is in a first position and conceal or cover the electrode when the sheath is in a second position;
a flexible electrically conducting member disposed through the flexible insulating outer tube and including a proximal end and a distal end, the distal end of the flexible electrically conducting member coupled to the electrode and configured to provide electrosurgical energy thereto;
wherein the flexible insulating outer tube and the flexible electrically conducting member are configured to enable the distal tip to achieve a plurality of positions relative to the flexible insulating outer tube,
a conductive tube coupler disposed in the connector and including a proximal end and distal end, the proximal end of the conductive tube coupler configured to receive the gas supply and the distal end of the conductive tube coupler configured to be coupled to the proximal end of the flexible insulating outer tube, a fluid channel extends from the proximal end of the conductive tube coupler to the distal end of the conductive tube coupler and provides inert gas to flexible insulating outer tube, the distal end of the conductive tube coupler coupled to the flexible conductive member disposed in the flexible insulating outer tube; and
a clip configured to be disposed over a portion of the conductive tube coupler, the clip being coupled to a wire for receiving the electrosurgical energy, the electrosurgical energy being provided via the clip, the conductive tube coupler and the flexible conductive member to the electrode.

19. An electrosurgical apparatus comprising:
a connector including a proximal end and a distal end, the proximal end of the connector configured to receive electrosurgical energy and a gas supply;
a flexible insulating outer tube including a proximal end and a distal end, the proximal end of the flexible insulating outer tube couple to the distal end of the connector;
a distal tip including a proximal end and a distal end, the proximal end of the distal tip coupled to the distal end of the flexible insulating outer tube, the distal tip including an electrode, the distal tip including a sheath that is retractable and extendable over the electrode to expose the electrode when the sheath is in a first position and conceal or cover the electrode when the sheath is in a second position;
a flexible electrically conducting member disposed through the flexible insulating outer tube and including a proximal end and a distal end, the distal end of the flexible electrically conducting member coupled to the electrode and configured to provide electrosurgical energy thereto;
an electrode coupler including a proximal end and a distal end, the proximal end of the electrode coupler coupled to the distal end of the flexible insulating outer tube, the distal end of the electrode coupler configured to support the electrode, the sheath being slidingly disposed over the distal end of the electrode coupler,
wherein the electrode includes at least one tab disposed that extends from a central portion of the electrode and the electrode coupler includes at least one recess, wherein the at least one tab aligns with the at least one recess and the at least one tab is bent into the at least one recess to secure the electrode.

20. The electrosurgical apparatus of claim 19, wherein the distal end of the electrode coupler further includes two slots diametrically opposed on an interior of the electrode coupler, wherein the slots are configured to receive the at least one tab of the electrode to secure the electrode laterally.

\* \* \* \* \*